(12) United States Patent
Johnson

(10) Patent No.: US 9,649,246 B1
(45) Date of Patent: *May 16, 2017

(54) MASSAGE DEVICE AND REMOVEABLE MOUNTING SYSTEM

(76) Inventor: Ronald B. Johnson, Casa Grande, AZ (US)

(*) Notice: Subject to any disclaimer, the term of this patent is extended or adjusted under 35 U.S.C. 154(b) by 1324 days.

This patent is subject to a terminal disclaimer.

(21) Appl. No.: 13/438,775

(22) Filed: Apr. 3, 2012

Related U.S. Application Data

(63) Continuation-in-part of application No. 13/358,291, filed on Jan. 25, 2012, now Pat. No. 9,039,641.

(51) Int. Cl.
*A61H 15/00* (2006.01)

(52) U.S. Cl.
CPC ......... *A61H 15/00* (2013.01); *A61H 15/0092* (2013.01); *A61H 2201/0119* (2013.01); *A61H 2201/0123* (2013.01); *A61H 2201/1695* (2013.01)

(58) Field of Classification Search
CPC  A61H 2201/0119; A61H 1/008; A61H 15/00; A61H 2015/0007; A63B 21/072; A63B 21/0726; A63B 21/078; A63B 21/0783
USPC ........... 248/49, 75, 176.1, 671, 678, 346.01, 248/346.03; 482/104
See application file for complete search history.

(56) References Cited

U.S. PATENT DOCUMENTS 563,170 A    6/1896  Haley et al.
896,484 A *  8/1908  Thoms ............... A61H 15/0092
                                                    601/120
744,718 A    11/1908 Cassidy
1,780,479 A * 11/1930 Griffith ................ A61H 15/00
                                                    482/79
1,998,197 A * 4/1935  Lang .................... A61H 15/00
                                                    119/531
2,037,495 A * 4/1936  Brogan ................ A61H 15/00
                                                    482/79
2,072,959 A * 3/1937  Mulvaney ............ A61H 15/00
                                                    601/122
2,078,382 A   4/1937  Hanshaw
2,082,829 A * 6/1937  Gerlofson ............ A63B 23/10
                                                    601/27

(Continued)

FOREIGN PATENT DOCUMENTS

DE    29701582    9/1997
GB      205989    11/1923
TW     M279334    11/2005

OTHER PUBLICATIONS

"Pentakis Dodecahedron" Wikipedia. Mar. 12 2001.
"Massage Tool for Back Pain Neck Pain Sore Muscles" Healthy Body Ball. http://www.healthybodyball.com.

*Primary Examiner* — Justine Yu
*Assistant Examiner* — Christopher Miller
(74) *Attorney, Agent, or Firm* — Booth Udall Fuller, PLC

(57) ABSTRACT

A massage device mounting system may include two mounting elements, each with a slot for receiving a removable massage bar with a cylindrical shaft and two opposing bar ends mounted within the slots. A massage device is pivotally coupled to the cylindrical shaft and includes a bore through the central axis of the massage device. A massage device mounting system may also include an adjustable support for mounting the massage device within a doorway or for supporting the massage device adjacent to a surface, such as a wall or a floor.

20 Claims, 25 Drawing Sheets

(56) References Cited

U.S. PATENT DOCUMENTS

| | | | | |
|---|---|---|---|---|
| 2,160,220 A * | 5/1939 | Fayette | ............... | F16C 27/066 384/536 |
| 2,258,931 A * | 10/1941 | Heer | ............... | A61H 15/0085 601/113 |
| 2,286,324 A * | 6/1942 | Wentz | ............... | A61H 15/0092 16/110.1 |
| 2,362,064 A | 11/1944 | Giesinger | | |
| 2,466,470 A | 4/1949 | Norris | | |
| 2,582,686 A * | 1/1952 | Benjamin | ............... | A61H 15/00 601/118 |
| 2,638,088 A * | 5/1953 | Johnson | ............... | A61H 7/007 482/79 |
| 2,638,089 A * | 5/1953 | Murphy | ............... | A61H 15/00 601/118 |
| D197,452 S * | 2/1964 | Correll | ............... | 297/423.41 |
| 3,897,923 A * | 8/1975 | Paepke | ............... | F16L 55/00 248/75 |
| 4,142,519 A * | 3/1979 | Ferguson | ............... | A61H 15/00 601/118 |
| 4,506,660 A * | 3/1985 | Curran | ............... | A61H 15/0078 601/115 |
| D287,405 S * | 12/1986 | Nakao | ............... | D24/211 |
| 4,648,387 A * | 3/1987 | Simmons | ............... | A61H 15/0092 482/79 |
| 4,743,017 A * | 5/1988 | Jaeger | ............... | A63B 21/075 482/108 |
| 4,832,006 A * | 5/1989 | Kirsch | ............... | A61H 1/008 601/122 |
| 4,846,159 A * | 7/1989 | Anzai | ............... | A61H 15/00 601/118 |
| D308,098 S * | 5/1990 | Lievonen | ............... | D24/211 |
| 4,921,191 A * | 5/1990 | Herschler | ............... | F16L 3/12 248/70 |
| 4,945,900 A * | 8/1990 | Masuda | ............... | A61H 15/0092 601/120 |
| D317,805 S | 6/1991 | Swan | | |
| 5,028,053 A | 7/1991 | Leopold | | |
| 5,131,665 A | 7/1992 | Myers | | |
| 5,143,056 A * | 9/1992 | Yih-Jong | ............... | A61H 15/00 601/118 |
| 5,251,908 A | 10/1993 | Myers | | |
| D345,468 S * | 3/1994 | McVicker | ............... | D6/349 |
| D358,858 S | 5/1995 | McGreevy | | |
| 5,467,490 A * | 11/1995 | Rice | ............... | A61H 15/00 5/636 |
| 5,558,625 A * | 9/1996 | McKay | ............... | A61H 15/00 601/118 |
| 5,569,123 A * | 10/1996 | Creatchman | ..... | A63B 21/00047 482/39 |
| 5,685,828 A * | 11/1997 | Dyck | ............... | A61H 15/00 297/423.41 |
| 5,947,666 A | 9/1999 | Huang | | |
| 6,090,021 A * | 7/2000 | Flowers | ............... | A63B 21/078 482/104 |
| D435,660 S | 12/2000 | Yoo | | |
| 6,245,031 B1 | 6/2001 | Pearson | | |
| D456,570 S | 4/2002 | Tsengas | | |
| 6,419,650 B1 * | 7/2002 | Ryan | ............... | A61H 15/00 601/122 |
| 6,443,863 B1 | 9/2002 | Dinoffer | | |
| D478,367 S | 8/2003 | Traub | | |
| 6,811,539 B1 * | 11/2004 | Nguyen | ............... | A61H 23/02 601/27 |
| 6,974,427 B1 * | 12/2005 | Lapham | ............... | A61H 15/00 601/120 |
| D516,640 S | 3/2006 | Shore | | |
| 7,007,978 B1 * | 3/2006 | Purdom | ............... | A63C 19/00 248/49 |
| 7,238,161 B2 | 7/2007 | Komkin et al. | | |
| 7,285,080 B1 * | 10/2007 | Chiu | ............... | A63B 21/0004 482/142 |
| 7,413,524 B1 | 8/2008 | Bibby | | |
| 7,458,945 B2 | 12/2008 | Zemont | | |
| D585,162 S | 1/2009 | Partain et al. | | |
| D599,963 S | 9/2009 | Crane et al. | | |
| D601,645 S | 10/2009 | Chapa, Jr. | | |
| D617,395 S | 6/2010 | Colangelo et al. | | |
| D619,663 S | 7/2010 | Quinn | | |
| D625,426 S | 10/2010 | Robins | | |
| D626,610 S | 11/2010 | Grimm | | |
| D629,056 S | 12/2010 | Grimm | | |
| D646,793 S * | 10/2011 | Wagner | ............... | D24/211 |
| 8,522,394 B2 * | 9/2013 | Lee | ............... | A47L 9/0027 15/323 |
| 2002/0103415 A1 * | 8/2002 | Manska | ............... | A61H 19/44 600/38 |
| 2004/0113025 A1 * | 6/2004 | Sargent | ............... | F16L 3/18 248/49 |
| 2005/0033205 A1 * | 2/2005 | Komkin | ............... | A61H 15/0092 601/131 |
| 2005/0049532 A1 * | 3/2005 | Lee | ............... | A61H 15/00 601/118 |
| 2006/0091265 A1 * | 5/2006 | Smart | ............... | F16L 3/02 248/49 |
| 2007/0129654 A1 * | 6/2007 | Anderson | ............... | A61H 15/00 601/119 |
| 2008/0103421 A1 | 5/2008 | Nicholson | | |
| 2008/0188362 A1 * | 8/2008 | Chen | ............... | A63B 21/063 482/107 |
| 2009/0124942 A1 * | 5/2009 | Ungureanu | ............... | A61H 15/00 601/137 |
| 2010/0049106 A1 * | 2/2010 | Gueret | ............... | A45D 34/041 601/112 |
| 2010/0148015 A1 * | 6/2010 | Matsuno | ............... | F16L 3/1075 248/65 |
| 2011/0245741 A1 * | 10/2011 | L'Homme | ............... | A61H 15/0085 601/120 |
| 2011/0313333 A1 * | 12/2011 | Nicholson | ............... | A61H 15/0092 601/120 |

\* cited by examiner

MASSAGE DEVICE AND REMOVEABLE MOUNTING SYSTEM

CROSS REFERENCE TO RELATED APPLICATIONS

This is a continuation-in-part application of pending patent application Ser. No. 13/358,291, to Johnson filed Jan. 25, 2012 and titled "MASSAGE APPARATUS," the disclosure of which is hereby incorporated herein by reference.

BACKGROUND

1. Technical Field

Aspects of this document relate generally to body massaging apparatuses and support structures for body massaging apparatuses.

2. Background Art

Massage balls and other apparatus are often used to treat or relax muscles. Typical massage balls comprise a ball with various points or knobs placed sporadically or in some pattern across the surface of the ball. These and other massage balls pose several problems in the utilization of the massage ball. First, if the massage ball has points or knobs that are too close together or too small, the massage ball is not effective in muscle treatment. When a ball with too many points or knobs is rolled over a muscle, the muscle recognizes or responds to only a spherical shape because of the close proximity of the relative contact points. Thus, the knobs or points are rendered useless. Second, massage balls with too few points or knobs do not roll smoothly. As a result, the knobs or points typically apply too much pressure in a disjointed fashion before sporadically rotating to the next knob or point in contact with the body. This is particularly the case for massage balls which are used in a fashion where they are placed on the ground and the user rolls the ball between the user's body and the ground or other firm surface. Sporadic or uneven rolling makes it difficult to treat the muscle predictably. Third, some massage balls are inflatable or air-filled apparatuses. These apparatuses, however, are prone to collapsing under pressure when applied in use. The collapse prevents effective use of the massage ball.

The effectiveness of a massage apparatus may be further enhanced by proper use. Typical massage apparatuses are limited to only certain positions without the assistance of another individual or apparatus.

SUMMARY

A first aspect of a massage device mounting system comprises two mounting elements, each comprising a slot, a massage bar comprising a cylindrical shaft and two opposing bar ends mounted within the slots of the two mounting elements, and at least one massage apparatus pivotally coupled to the cylindrical shaft and comprising a bore hole through a central axis of the massage apparatus, the bore hole housing at least a portion of the cylindrical shaft.

In particular implementations and embodiments, the massage device mounting system may comprise one or more of the following. A telescoping mounting system may be coupled to the two mounting elements, the telescoping mounting system comprising a first end and a second end opposite the first end, wherein a positional distance between the first end and the second end is adjustable by telescoping the mounting system between an extended position and a retracted position. The telescoping mounting system may further comprise the first end coupled to an outer frame member and the second end extending directionally from the first end towards the second end, a male screw coupled to the first end and housed within an outer frame member, and an inner frame member at least partially within the outer frame member and coupled to the second end and the male screw, the inner frame member comprising a female threaded end that couples to the male screw, wherein a length of the telescoping doorway mount is changed to fit within a doorway when the inner frame member is rotated along the male screw. The slots of the two mounting elements may each comprise a curved notch and one or more flexibly biased elements that hold the massage bar within the curved notch. The first end of the doorway mount may comprise a rectangular base and two walls extending from the rectangular base towards the second side, wherein the outer frame member and the male screw are between the walls and coupled to the walls. The telescoping mounting system may further comprise a ratcheted interface between the first end and the second end. The two mounting elements may comprise two surface mounts each comprising a base end and a top end opposite the base end, and the slot comprises a reentrant curved slot on the top end of the surface mount, wherein each handle is mounted within the curved slot of one of the two surface mounts. At least a portion of the two mounting elements may comprise a flexible bias such that the curved slot flexes as the handle is inserted into the curved slot. The system may further comprise at least one rib in each of the curved slots and at least one groove on each of the handles, the at least one rib configured to fit within the at least one groove. The system may further comprise at least one screw hole that extends through the base end of each of the two surface mounts. The system may further comprise an aperture on the base end of each surface mount, the aperture sized to hold one of the two handles. The massage apparatus may further comprise an array of thirty-two massage fingers arranged on a body such that a center axis of each of the thirty-two massage fingers aligns with one of thirty-two vertex axes that extend from a body center point formed by an intersection corresponding to each vertex axis to one of thirty-two vertices of a pentakis dodecahedron; wherein each massage finger of the thirty-two massage fingers is spaced substantially equally from at least five massage fingers nearest to each massage finger of the thirty-two massage fingers at a distance ratio of approximately 0.9:1.0. The at least one massage apparatus comprises two massage apparatuses and the massage bar may further comprise a flange bearing on each side of each bore hole, a first and second sleeve disposed about the cylindrical shaft such that the two massage apparatuses are between the first and second sleeves, a third sleeve disposed about the cylindrical shaft between the two massage apparatuses, and two handles coupled to the shaft on opposing ends of the shaft, the two handles positioned such that the two massage apparatuses are between the two handles on the shaft.

A method for removably mounting a massage apparatus may comprise placing opposing ends of a massage bar into two separate mounting elements coupled to a telescoping doorway mount, the massage bar comprising a cylindrical shaft that passes through a bore hole on the massage apparatus such that massage apparatus is pivotally coupled to the cylindrical shaft, and rotating an inner frame member of the telescoping doorway mount while holding an outer frame member in a fixed position until the telescoping doorway mount is tensionally held within a doorway.

Aspects of a system for mounting a massage apparatus for pivotal use may comprise a massage bar comprising a cylindrical shaft inserted through a hole on the massage apparatus such that the massage apparatus rotates about the cylindrical shaft, and two mounting elements each holding an opposite end of the massage bar at least partially within the mounting element.

Particular implementations of a system for mounting a massage apparatus for pivotal use may comprise one or more of the following. The massage bar may further comprise two flange bearings that stabilize rotation of the massage apparatus about the cylindrical shaft and are disposed at least partially within opposite ends of the bore hole, two hollow sleeves each abutting one flange bearing and disposed about the cylindrical shaft, and two handles disposed about opposite ends of the cylindrical shaft. The system may further comprise a telescoping doorway mount coupled to the two mounting elements, the telescoping doorway mount comprising a first end and a second end opposite the first end, wherein a positional distance between the first end and the second end is adjustable by telescoping the doorway mount between an extended position and a retracted position. The telescoping doorway mount may further comprise a ratcheted interface between the first end and the second end. The telescoping doorway mount may comprise an outer frame member distal to the first end of the doorway mount, a male screw coupled to the first end and extending toward the second end of the telescoping doorway mount, and an inner frame member at least partially within the outer frame member and distal the second end of the doorway mount, the inner frame member comprising a female threaded end that couples to the male screw, wherein a length of the telescoping doorway mount is changed to fit within a doorway when the inner frame member is rotated along the male screw. The two mounting elements may each comprise a curved notch and one or more biased elements that hold the massage bar within the curved notch. The two mounting elements may comprise two surface mounts comprising a base end and a top end opposite the base end, wherein each handle is mounted within a curved slot on the top end of one of the two surface mounts. The system may further comprise at least one rib in each of the curved slots and at least one groove on each of the handles, the at least one rib configured to fit within the at least one groove. The system may further comprise at least one screw hole that extends through the base end of each of the two surface mounts. The system may further comprise an aperture on the base end of each surface mount, the aperture sized to hold one of the two handles.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112, ¶6. Thus, the use of the words "function," "means" or "step" in the Detailed Description or Description of the Drawings or claims is not intended to somehow indicate a desire to invoke the special provisions of 35 U.S.C. §112, ¶6, to define the invention. To the contrary, if the provisions of 35 U.S.C. §112, ¶6 are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. §112, ¶6. Moreover, even if the provisions of 35 U.S.C. §112, ¶6 are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The disclosure will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended massage apparatuses and/or assembly procedures for massage apparatuses will become apparent for use with implementations of massage apparatuses from this disclosure. Accordingly, for example, although particular massage apparatuses are disclosed, such massage apparatuses and implementing components may comprise any shape, size, style, type, model, version, measurement, concentration, material, quantity, and/or the like as is known in the art for such massage apparatuses and implementing components, consistent with the intended operation of massage apparatuses.

Figure 1:
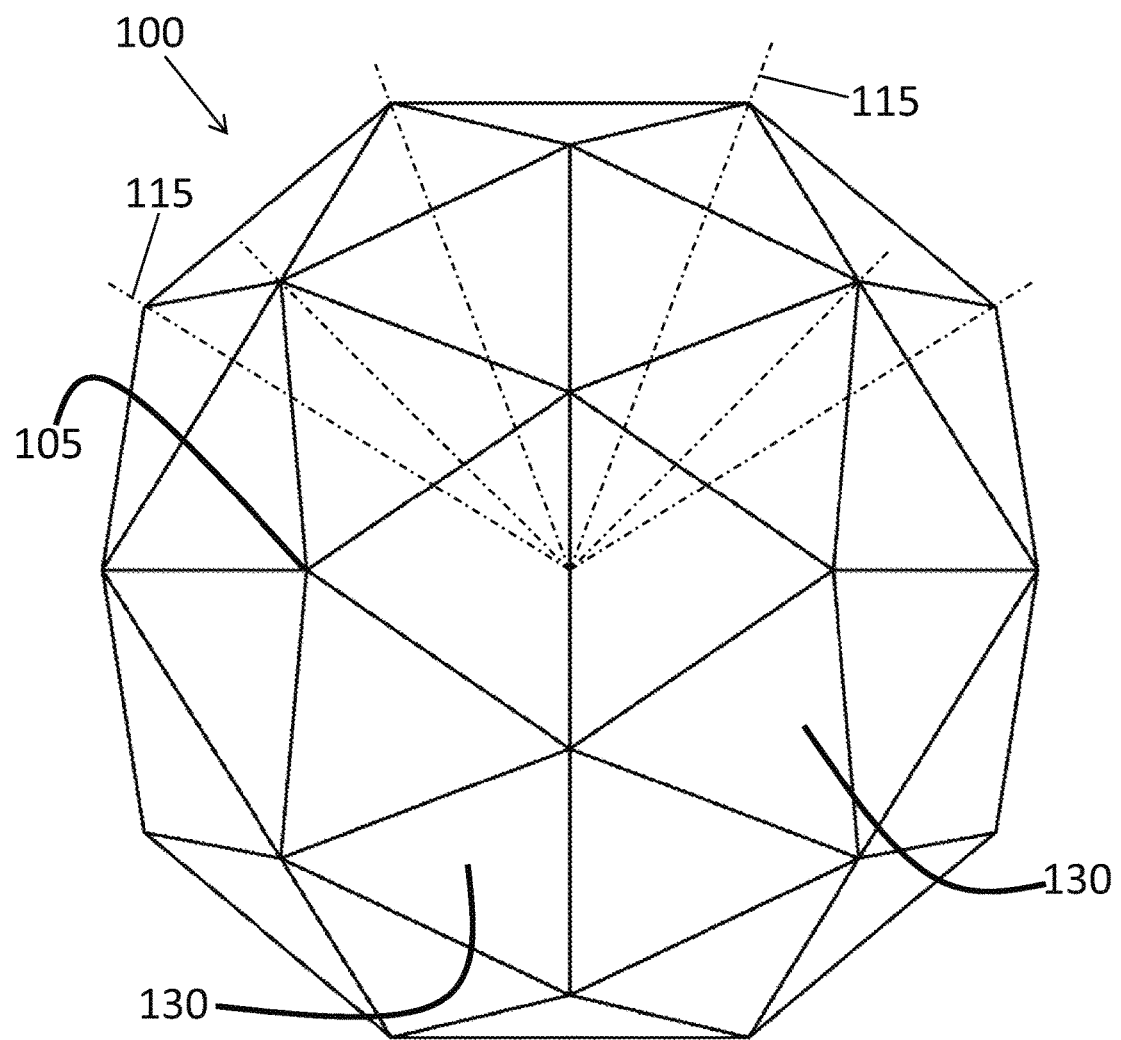
FIG. 1 is a front view of a pentakis dodecahedron.

Various implementations of massage apparatuses are disclosed herein. Some implementations use a variety of a platonic and a non-platonic three-dimensional geometric polyhedron as a basis for configuration of massage fingers on the massage apparatus. Such polyhedron figures may include, but are not limited to tetrahedrons, octahedrons, cubes, icosahedrons, dodecahedrons, pentakis dodecahedrons, pentagonal icositetrahedrons, or triakis icosahedrons. Each polyhedron comprises a corresponding number of vertices and faces, as well as a specific dihedral angle. A dihedral or torsion angle is the angle between two planes. Accordingly, a tetrahedron comprises four vertices and a dihedral angle of 70.53 degrees. An octahedron comprises six vertices and a dihedral angle of 109.47 degrees. A cube comprises eight vertices and a dihedral angle of 90.00 degrees. An icosahedron comprises twelve vertices and a dihedral angle of 138.19 degrees. A dodecahedron comprises twenty vertices and a dihedral angle of 116.57 degrees. A pentagonal icositetrahedron comprises 38 vertices and a dihedral angle of 136.33. A triakis icosahedron comprises 32 vertices and a dihedral angle of 160.61. A pentakis dodecahedron 100 is illustrated in FIG. 1, and comprises thirty-two vertices 105, sixty faces 130, and a dihedral angle of 156.72 degrees. FIG. 1 also illustrates a vertex axis 115 that extends from the three-dimensional center of the pentakis dodecahedron through a vertex 105.

Various implementations of a massage ball may utilize any three-dimensional polyhedron listed herein or otherwise in a configuration of a massage apparatus. As shall be described in greater detail with respect to FIGS. 2-6, a massage apparatus may comprise an array of massage fingers or protrusions, the centers of which align with vertex axes that extend from a center of a theoretical three-dimensional figure through vertices of the theoretical three-dimensional figures.

For effective use, massage fingers or protrusions on a massage apparatus must be spaced far enough apart to stimulate individual points within soft tissue of a person on whom the massage the massage apparatus is being utilized. On the other hand, effective use of a massage apparatus is greatly enhanced when the massage fingers or protrusions are spaced close enough and relatively uniformly across the massage apparatus to enable both easy and predictable translation/rolling of the massage apparatus between the user's body and the opposing surface.

Accordingly, specific implementations of a massage apparatus may utilize a polyhedron comprising at least twenty vertices and not more than forty vertices as a base geometric shape for the massage apparatus. At least twenty massage fingers or protrusions spaced at substantially equal spacing across a massage apparatus provides a massage apparatus that is advantageous to prior art because the massage fingers or protrusions are far enough apart to allow for proper stimulation of individual points within soft tissue of the receiver, while close enough and uniformly spaced to enable easy and predictable translation/rolling of the massage apparatus.

Implementations utilizing a platonic polyhedron, such as a dodecahedron, as a base for the massage apparatus comprise massage fingers at an equal distance from the nearest massage fingers. Particular therapeutic advantage has been found in implementations using a non-platonic polyhedron, such as a pentakis dodecahedron, as a base for a massage apparatus, the massage fingers may be at substantially or nearly equal spacing from the nearest massage fingers. For example, in a massage apparatus utilizing a pentakis dodecahedron, the ratio of distances between nearest and furthest adjacent vertex axes or massage fingers is approximately 0.9:1:0.

Figure 9:
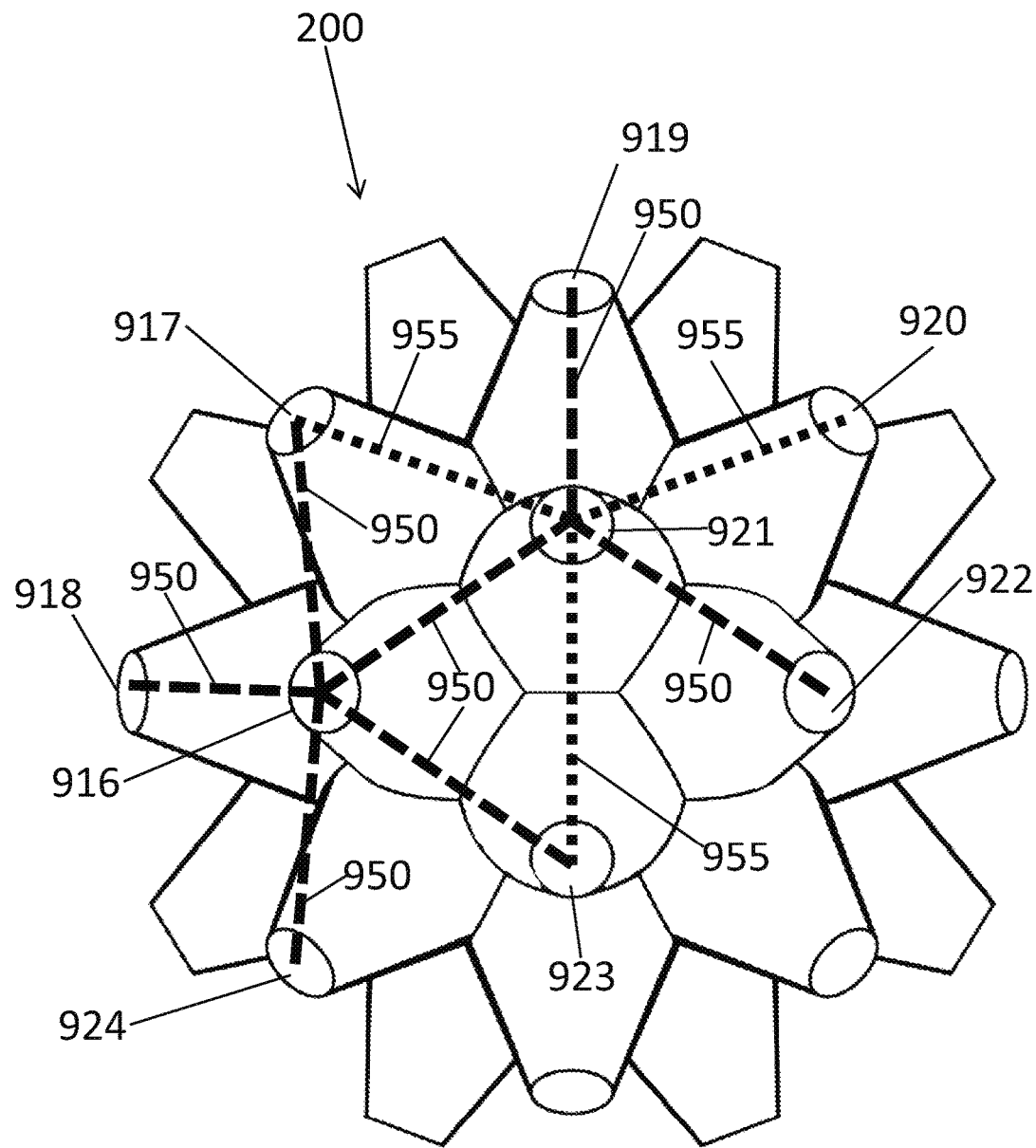
FIG. 9 is a perspective view of a massage apparatus illustrating the respective distances between massage fingers.

In a pentakis dodecahedron, twenty vertices of the thirty-two vertices are each surrounded by six vertices, while the remaining twelve vertices are surrounded by five vertices. As illustrated in FIG. 9, for a massage finger 916 surrounded by only five massage fingers 917, 918, 921, 923, 924, the first or lesser distance 950 between the central massage finger 916 and each of the five surrounding massages fingers 917, 918, 921, 923, 924 is an equal distance 950. A massage finger 921 surrounded by six massage fingers 916, 917, 919, 920, 922, 923 comprises three fingers 917, 920, 923 at a second or greater distance 955 than the first or lesser distance 950 between the massage finger 921 and the remaining three massage fingers 916, 919, 922. In an implementation, the relative ratio of the lesser distance 950 to the greater distance 955 is approximately 0.9:1.0. Each of the twenty vertices or massage fingers surrounded by only five vertices or massage fingers may comprise a pattern similar to that illustrated in FIG. 9, specifically each of the five surrounding vertices or massage fingers are at the same distance from the central massage finger. Likewise, each of the twelve vertices or massage fingers surrounded by six vertices or massage fingers may comprise a pattern similar to that illustrated in FIG. 9. Specifically, the three lesser distanced and three greater distanced massage fingers may alternate in placement around the central massage finger. The precise distance ratio between the lesser distance 950 and the greater distance 955 may be calculated with the formula: $18*(2*\sqrt{5}-1)/57*(\sqrt{5}-1)=0.887058$, or approximately 0.9:1.0. The same spacing configuration between massage fingers of FIG. 9 may be applied to any implementation disclosed herein, and is not limited to the implementation illustrated in FIG. 9.

Figure 2:
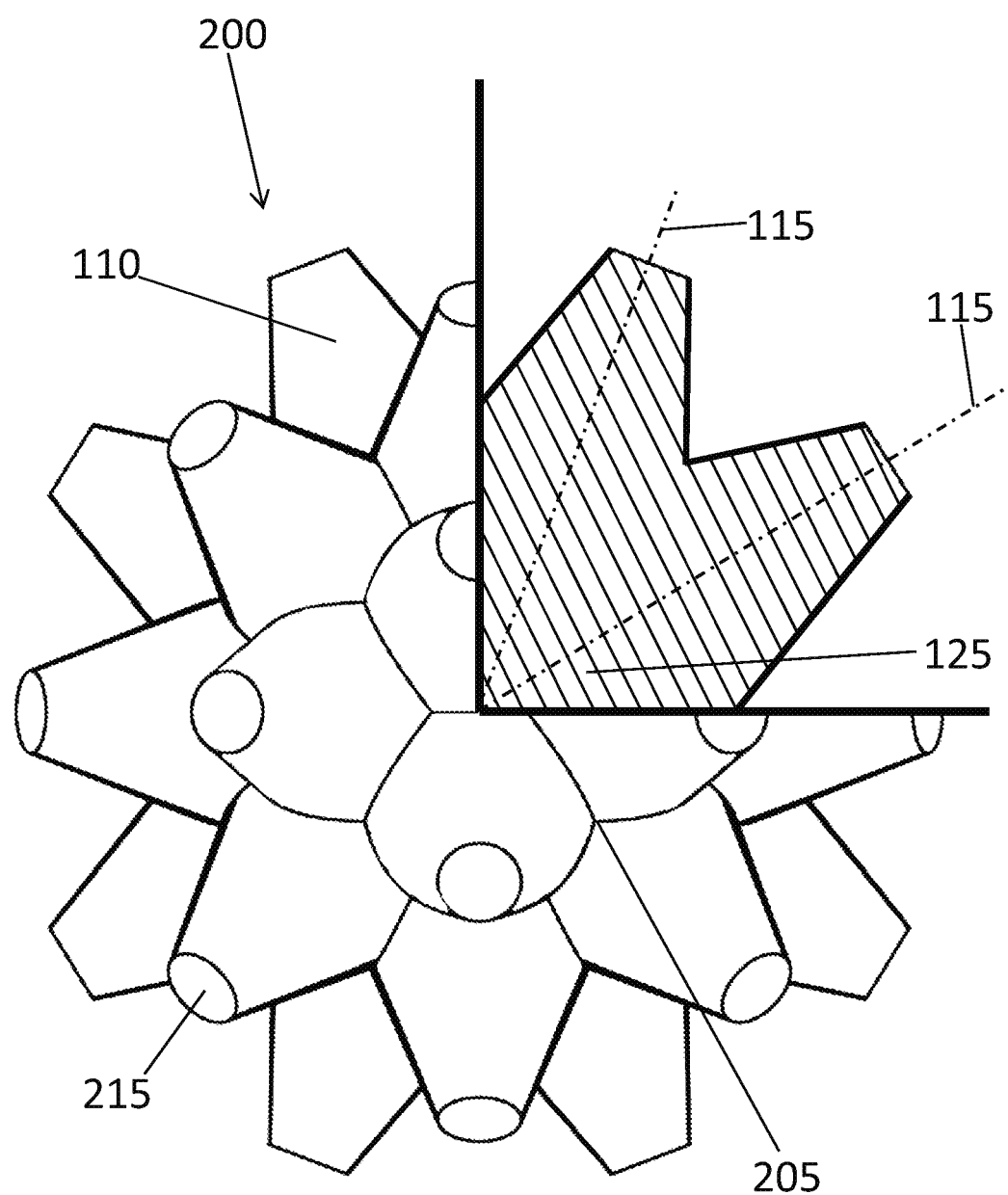
FIG. 2 is a partial cross-sectioned front view of first implementation of a massage apparatus.

Referring now to FIG. 2, a partial cross-section view of an implementation of a massage apparatus 200 is illustrated. According to a particular implementation, a massage apparatus 200 may comprise an array of merged massage fingers 110 around a central massage apparatus body 125. The massage fingers 110 of massage apparatus 200 are substantially conical in shape with a flat outward tip 215 and an inward base 205. As shall be shown in other implementations, the massage fingers 110 may comprise any shape and any tip and/or base configuration. In FIG. 2, the inward bases 205 of the massage fingers 110 intersect to form a central body 125. In other implementations, the massage fingers may be coupled or configured to a body 125 in any manner.

The implementation of FIG. 2 utilizes a theoretical pentakis dodecahedron base and comprises thirty-two massage fingers 110 spaced to correspond with the spacing of the thirty-two vertices of a theoretical pentakis dodecahedron base shape, whether the actual shape of the base is a pentakis dodecahedron, a sphere, or any other shape. The massage fingers 110 may be aligned such that a center axis 115 central to the outward flat tip 215 and the inward base 205 of the massage apparatus 200 extends from a center of the body 125 through the center of the inward base 205 and outward tip 215. For relative positioning of the massage fingers 110, the center of the body 125 is aligned with a center of the theoretical polyhedron, specifically in this implementation the center of the pentakis dodecahedron for aligning of the massage fingers 110 with the locations of where the vertices of the pentakis dodecahedron would exist. The center axes 115 of the massage apparatus 200 is positioned so as to correspond with the vertex axes 115 of the shape illustrated in FIG. 1.

Other implementations similar to massage apparatus 200 may comprise any number of massage fingers 110 aligned positioned to correspond with the vertices of any type of polyhedron. For example, an implementation may comprise a dodecahedron as a base polyhedron shape for a massage apparatus. Such an implementation may then comprise twenty massage fingers, each equally spaced from the three nearest massage fingers. Furthermore, the center axes of the twenty massage fingers 110 would align with the locations of the twenty vertex axes of a dodecahedron extending from a center of the dodecahedron to each of the twenty vertices.

The massage apparatus 200 and other massage apparatuses disclosed herein may comprise a variety of sizes and hardness measurements. Particular implementations may comprise a massage apparatus with a diameter of between two and six inches from the outer tip of a massage finger 110 to the outer tip of a massage finger on an opposing side of the massage apparatus. While implementations may comprise a variety of materials, such as but not limited to rubbers, foams, plastics, inflatables, and the like, in a particular implementation, the massage apparatus comprises a thermoplastic elastomer or natural rubber. In particular implementations, the hardness ranges from forty to eighty Shore A durometers. Other sizes and hardnesses may be used depending upon the particular size and weight of the user, the particular area of the body being treated, and the particular massage therapy being administered.

Figure 3:
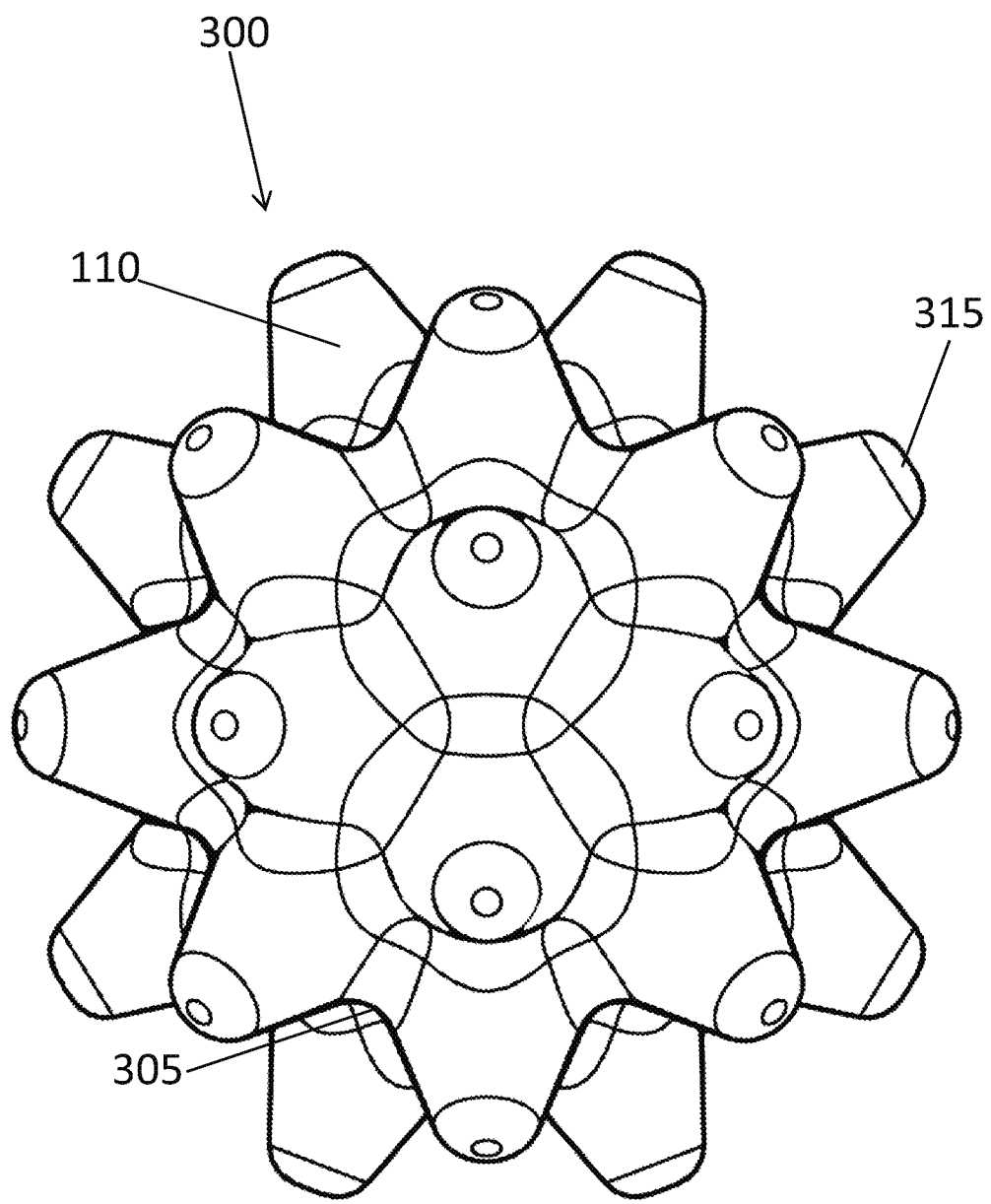
FIG. 3 is a front view of a second implementation of a massage apparatus.

Referring now to FIG. 3, illustrating a massage apparatus 300 comprising a rounded tip 315 on each massage finger 110 and a filleted edge 305 or intersection at the intersection of the inward base of each massage finger 110 with other surrounding massage fingers 110. The plurality of massage fingers 110 on massage apparatus 300 may be arranged and spaced based on a theoretical polyhedron as previously described. The massage fingers 110 of FIG. 3 are substantially conical in shape, while massage fingers 110 for this or any other implementation may comprise any shape, such as but not limited to cylindrical, cubical, spherical, diamond shaped, and the like.

In specific implementations, the apex angle of the cone-shaped massage fingers 110 is between twenty and sixty degrees. The height of massage fingers 110 from the rounded tip 315 to the filleted edge 305 is greater than 0.25 inches. Other implementations may comprise any angle and any massage finger 110 height.

Figure 4:
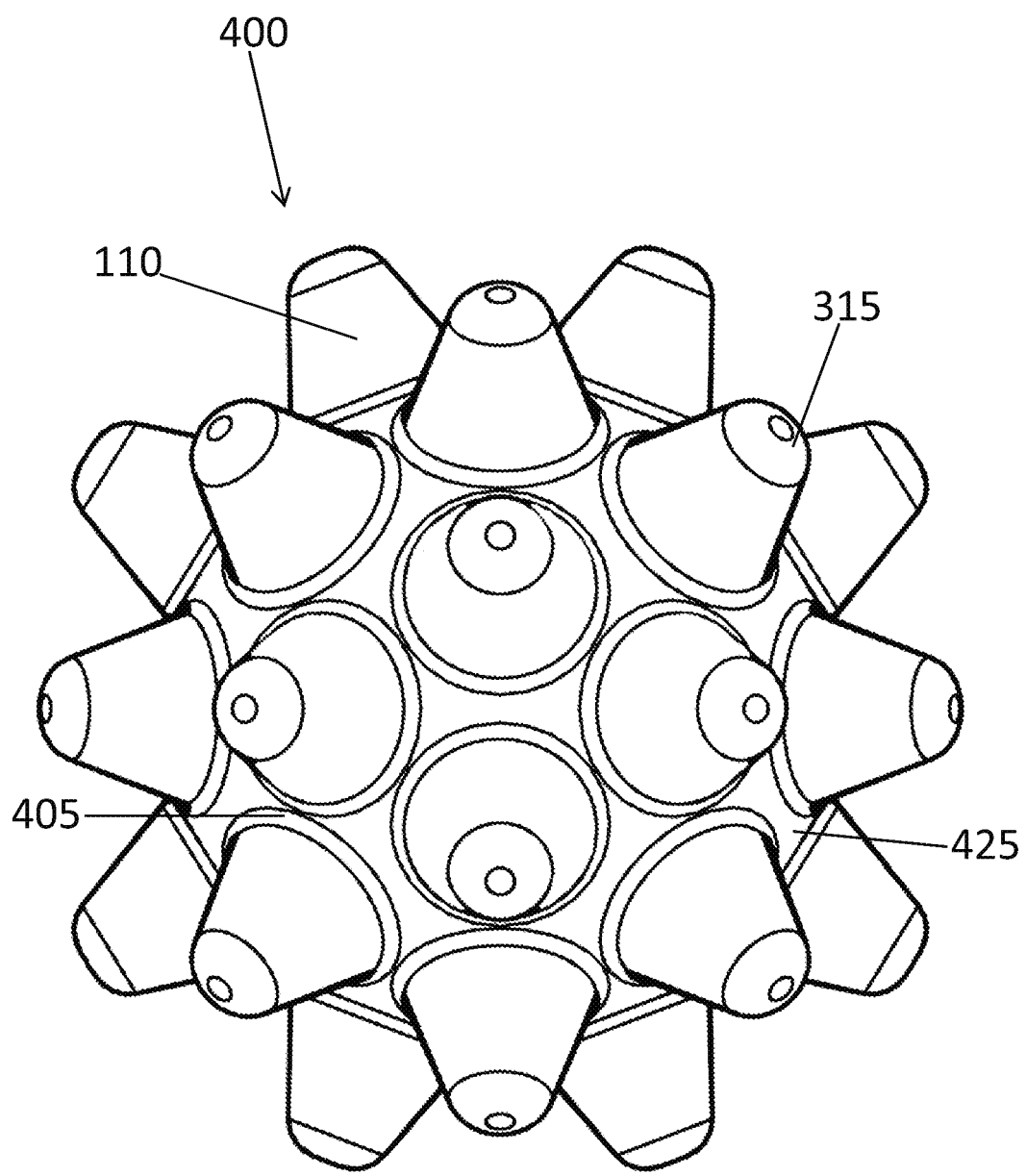
FIG. 4 is a front view of a third implementation of a massage apparatus.

Referring now to FIG. 4, illustrating a massage apparatus 400 comprising a spherical body 425. The plurality of massage fingers 110 on massage apparatus 400 may be arranged and spaced based on a theoretical polyhedron as previously described, so as to correspond with the locations of the vertices of a particular polyhedron. The intersection of the massage fingers 110 and the spherical body 425 may comprise a filleted intersection 405, or any type of intersecting planes.

Figure 5:
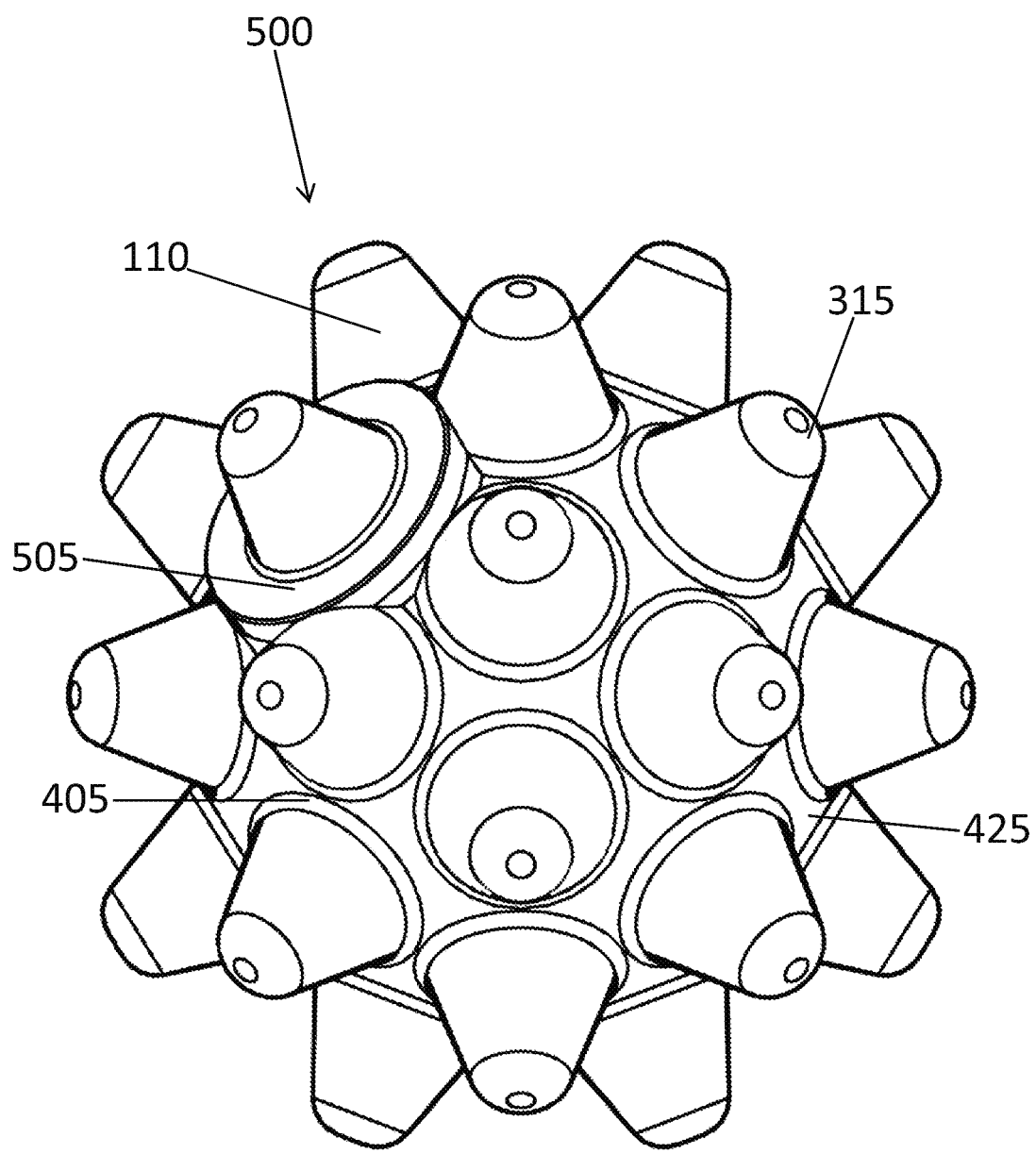
FIG. 5 is a front view of a fourth implementation of a massage apparatus.

Referring now to FIG. 5, illustrating a massage apparatus 500 further comprising a boss 505 at the base of at least one massage finger 110. Other implementations may comprise a boss 505 at the base of any number of the massage fingers 110. The plurality of massage fingers 110 on massage apparatus 500 may be arranged and spaced based on a theoretical polyhedron as previously described, so as to correspond with the vertices a particular polyhedron. As illustrated in FIG. 5, the boss 505 comprises a cylindrical configuration that circumnavigates or surrounds at least a portion of the inward base of the massage finger 110. In other implementations, the boss 505 may comprise any shape or finishing edge around the massage finger 110 that allows the massage finger 110 to locate onto or within another opening of a separate massage apparatus, thus locating or joining the massage apparatus 500 with another massage apparatus. For example, the particular massage finger 110 comprising the boss 505 at the base may be sized, shaped, or otherwise configured to fit within a substantially conical hole, void, or depression on a separated massage apparatus (shown in greater detail in FIG. 6).

The boss 505 may further comprise any type of coupling element, such as but not limited to magnets, adhesive, screw threads, pins, and the like. In an embodiment, a magnet may be place under the surface of the boss 505 such that the magnet does not decrease performance of the massage apparatus 500, but may nonetheless still be attracted to metal or an opposite poled magnet. In this and any other implementations discussed herein, the massage fingers 110 may be configured to be removably coupled to the base 125, 425. The removable coupling of a massage finger 110 to the base 125, 425 may work by way of magnets, adhesive, screw threading, pins, or any other elements for removable coupling. In particular implementations, the boss 505 may simply be used as a marking location for marking the massage ball with a product name or manufacturer name. Nevertheless, the inclusion of the boss 505 surrounding a massage finger 110 does not interrupt the placement of the remaining massage fingers 110.

Figure 6:
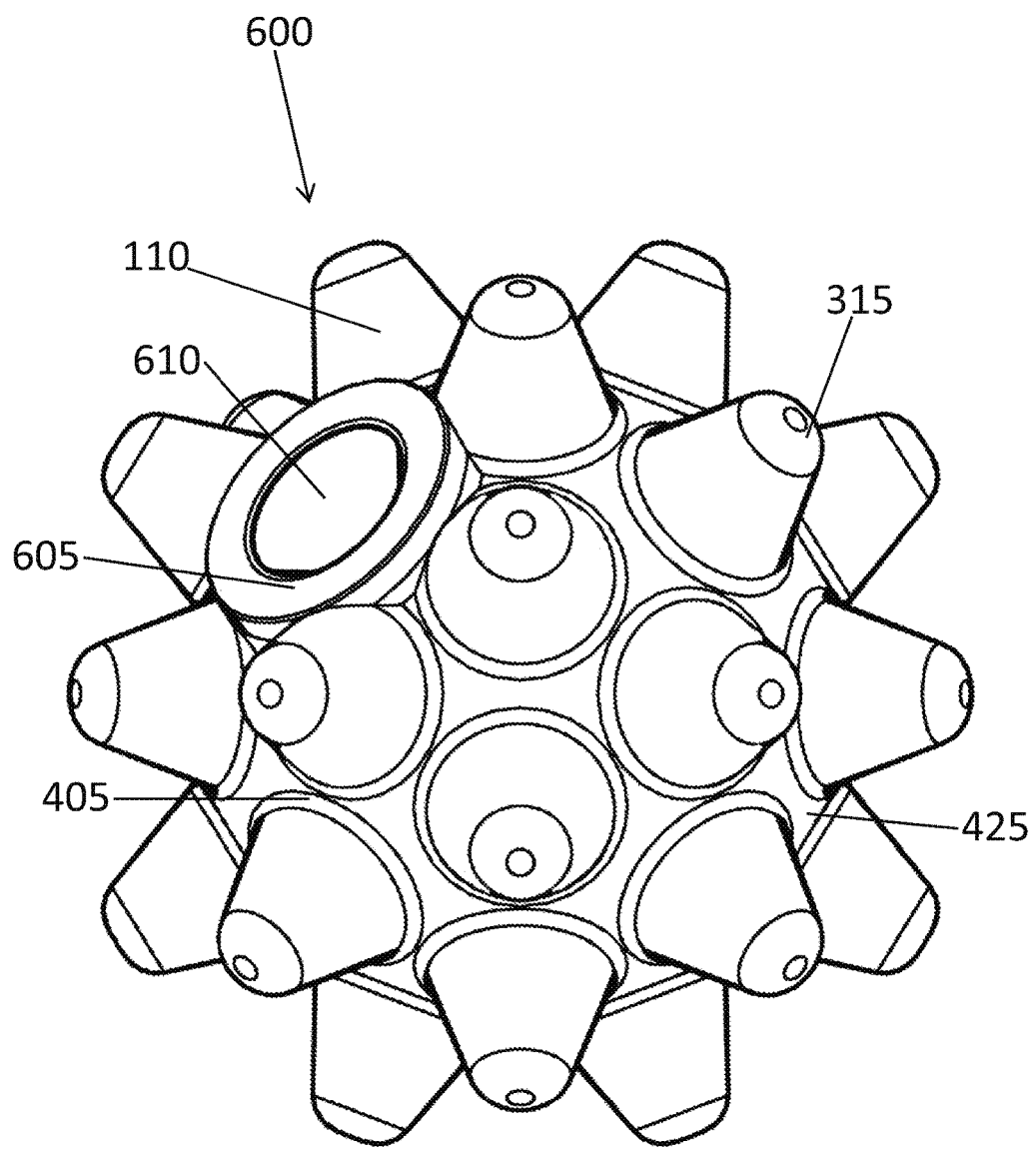
FIG. 6 is a front view of a fifth implementation of a massage apparatus.

Referring now to FIG. 6, illustrating a massage apparatus 600 comprising a recessed receiving element 610 in place of a massage finger 110. Other implementations may comprise any number of recessed receiving elements 610 in place of any number of massage fingers 110. The recessed receiving element 610 may comprise any type of recess, hole, void, channel, through-hole, or depression sized, shaped, or otherwise configured to receive a massage finger 110 from separate massage apparatus, a post or handle from a massage grip, or any other type of connecting apparatus.

The recessed receiving element 610 may be surrounding by a boss 605. As illustrated in FIG. 6, the boss 605 comprises a cylindrical configuration that circumnavigates or surrounds the recessed receiving element 610. In particular implementations, the receiving element 610 extends all the way through the body 425 to form a bore hole so that a handle or shaft can be extended through the massage ball 600 for convenient handling and use of the massage ball. In other implementations, the boss 605 may comprise any shape or finishing edge around the recessed receiving element 610 that allows the recessed receiving element to locate onto or within another opening of a separate massage apparatus, thus locating or joining the massage apparatus 600 with another massage apparatus or connecting apparatus. For example, recessed receiving element 610 may be sized, shaped, or otherwise configured to hold similarly sized, shaped, or otherwise configured protrusion on another massage apparatus or connecting apparatus. In an implementation, the boss 605 may mate with a boss receiver on another massage apparatus or connecting apparatus.

With the exception of the at least one recessed receiving element 610, the plurality of massage fingers 110 on massage apparatus 600 may be arranged and spaced based on a theoretical polyhedron as previously described, so as to correspond with the vertices of a particular polyhedron. For example, in an implementation with massage fingers 110 placed to align with the vertices of a theoretical pentakis dodecahedron, the massage apparatus may comprise thirty or thirty-one massage fingers 110 corresponding to thirty or thirty-one vertices and two or one recessed receiving element 610 corresponding to two or one vertex of the thirty-two vertices of the theoretical pentakis dodecahedron. In a particular implementation, two recessed receiving elements 610 are included on exactly opposite, aligning positions of the massage apparatus 600. In other implementations, regardless of theoretical polyhedron, a recessed receiving element 610 may be aligned with a vertex of the polyhedron in place of a massage finger 110.

Figure 7:
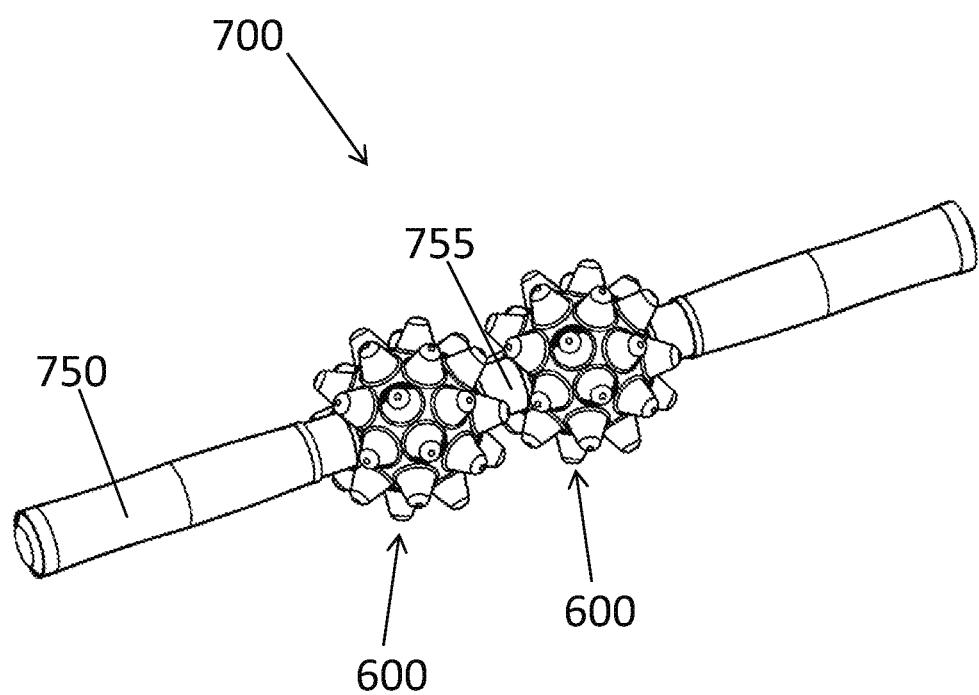
FIG. 7 is a perspective view of a massage apparatus and massage bar.

Referring now to FIG. 7, illustrating a plurality of massage apparatuses 600 coupled to massage bar 750. In a particular implementation, the massage apparatus 600 may be void of two massage fingers 110 on opposing sides of the massage apparatus 600. The recessed receiving elements 610 replacing each of the two voided massage fingers are aligned with two opposing vertex axes 115 of a polyhedron. The recessed receiving elements may be further configured to continue until the two receiving elements 610 meet, thus forming a channel, hole or void that continues through the massage apparatus 600. Such an implementation may be configured to receive a massage bar 750 or rod that extends through the massage apparatus 600. The massage bar 750 may extend through a second massage apparatus or may alternatively connect to a similarly coupled second massage apparatus and bar. A spacer or sleeve 755 may be placed on the massage bar 750 between adjacent massage apparatuses 600.

In various implementations illustrated in FIGS. 7, 10, 13-15, 19-23, and 25, a massage bar 750, 994 may comprise a shaft 753 (see FIG. 20) configured or otherwise sized to fit through the bore hole 758 on implementations of massage apparatuses. The shaft 753 may comprise a variety of materials, such as but not limited to plastics, rubbers, metals, wood, and the like. In a particular implementation, the shaft 753 comprises a fiberglass shaft.

The massage bar 750 may further comprise a handle 752, 995 on each end of the massage bar 750. In particular implementations, the massage bar 750 may further comprise at least one sleeve 755 about the shaft used as a spacer. For example, a sleeve 755 may be placed between the two massage apparatuses 600, and between each massage apparatus 600 and the handles 752, 995. The sleeve may be comprised of a variety of materials, such as but not limited to PVC, plastic, rubber, metal, and the like.

The massage bar may further comprise a flange bearing 756 at the boss 605 of massage apparatus 600, or even without the boss in other implementations. The flange bearing 756 may be inserted into an end of the bore hole 758 before or as the shaft 753 is inserted through the bore hole 758. The flange bearing 756 may assist in the rotating efficiency of the massage apparatus 600 about the shaft 753, and may be comprised of a variety of materials such as but not limited to nylon, plastic, rubber, metal, and the like.

In an alternative implementation, the massage bar 750 may comprise a tip configured to mate with the receiving element 610 of the massage apparatus 600 and removably couple the massage bar 750 to the massage apparatus 600. Two massage apparatuses 600 may be removably coupled together with a spacer 755 adapted to couple to each of two massage apparatuses 600, one at either end. The spacer 755 may either fit within recessed receiving elements 610 of the massage apparatus 600, or hold massage fingers 110 of the massage apparatus 600. Bosses 505, 605 may assist in coupling the massage apparatus 500, 600 to the spacer 755 and/or the massage bar 750.

Coupling of various implementations of massage apparatuses 600 to the massage bar 750 comprises a pivotal mounting that allows the massage apparatus 600 to roll and rotate over a body or other surface while the massage bar 750 handles do not rotate. Rotation of the massage apparatus (es) 600 is typically about a center axis of the massage bar 750. Configuration of the rolling massage apparatus(es) coupled to the massage bar 750 allows for effective use of the massage apparatus(es) 600 over a greater amount of body area. For example, a user of the combined massage bar 750 and massage apparatus(es) 600 may reach and massage other body areas for self massage, or a therapist or massage assistant may use the bar to assist in providing a deeper massage in particular situations.

Figure 8:
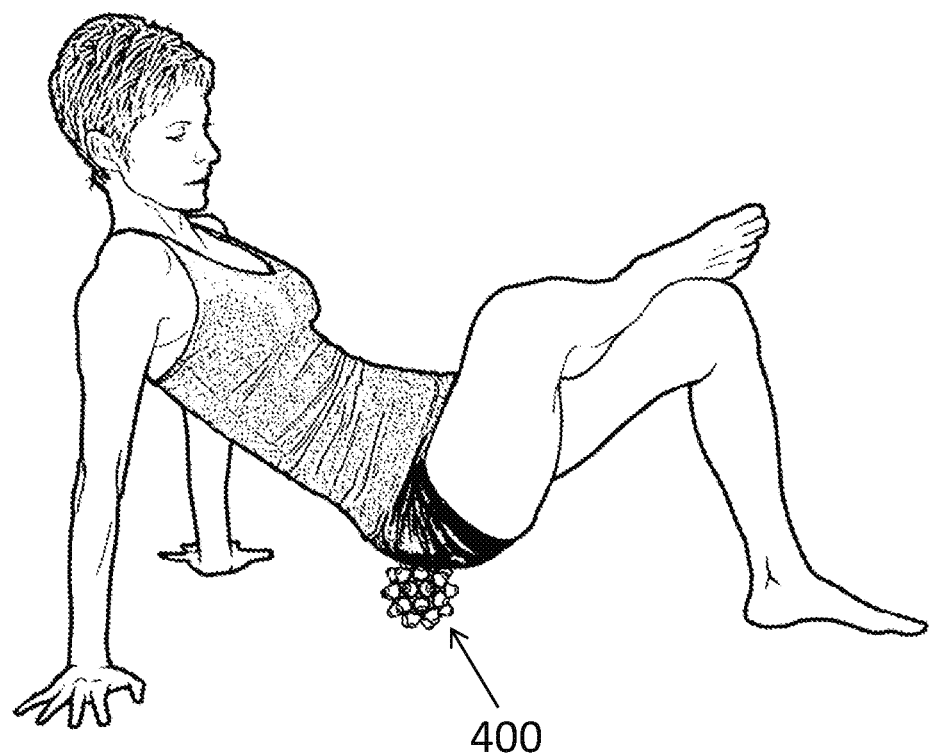
FIG. 8 is a perspective view of an exemplary use of a massage apparatus.

Referring now to FIG. 8, illustrating an exemplary use of a massage apparatus 400. Although massage apparatus 400 is illustrated in FIG. 8, any massage apparatus disclosed herein may be utilized in similar fashion. The massage apparatus 400 may be placed between a user and a surface, such as a floor, wall, ground, door, window, etc. The massage apparatus 400 may be further used by pressing the massage apparatus 400 against a user's body with the user's own hands or the hands of another individual. Due to the spacing, configuration, and/or number of massage fingers 110 on the massage apparatus 400, the massage apparatus 400 effectively, consistently and evenly rolls between the user and the surface, by evenly moving across the floor due to the regular and consistent spacing of the massage fingers 110. The spacing, configuration, and number of massage fingers 110 further allows for individual massage fingers 110 to effectively reach the soft tissue of the user.

Figure 10:
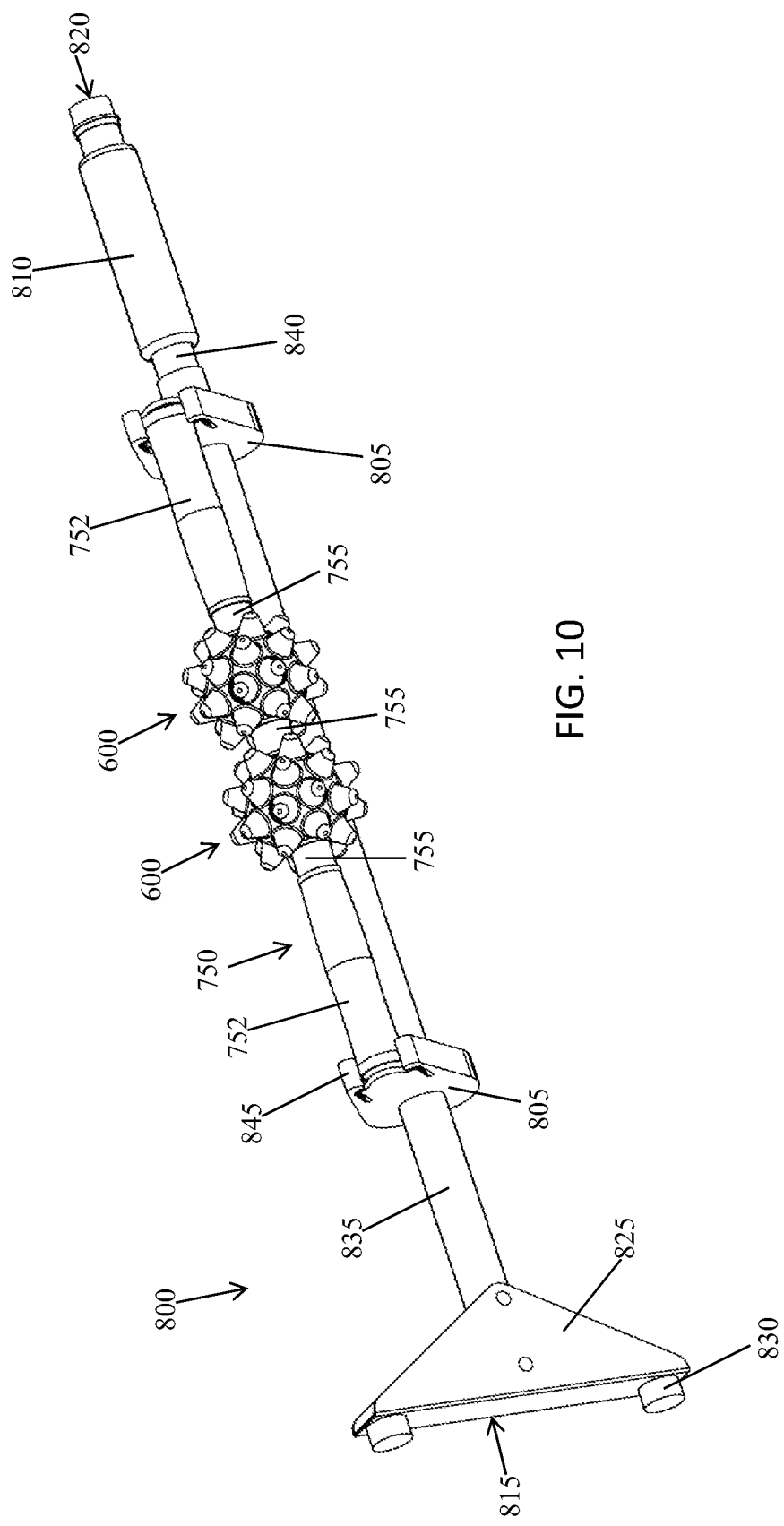
FIG. 10 is a perspective view of massage apparatuses, a massage bar, and a telescoping doorway mount.

Referring now to FIG. 10, illustrating a massage apparatus device or system for pivotally mounting a massage apparatus 600. Although massage apparatus 600 is illustrated in FIGS. 7, 10, 13-15, 19-23, and 25, it will be understood that modifications of any of the massage apparatuses disclosed herein allow for similar use or mounting. Similarly, although massage bar 750 is illustrated and described in use with FIGS. 10 and 13, massage bar 994 and other massage bars are also contemplated for use in the telescoping doorway mount 800. In FIG. 10, massage bar 750 is mounted on a telescoping doorway mount 800. In various implementations, the doorway mount 800 may comprise a first end 815, a second end 820 opposite the first end 815, an outer frame member 835, and inner frame member 840, and at least two mounting elements 805. The massage bar 750 may be mounted within or to the telescoping doorway mount 800 by coupling and/or mounting the handles 752 or shaft 753 to the mounting elements 805.

Figure 11:
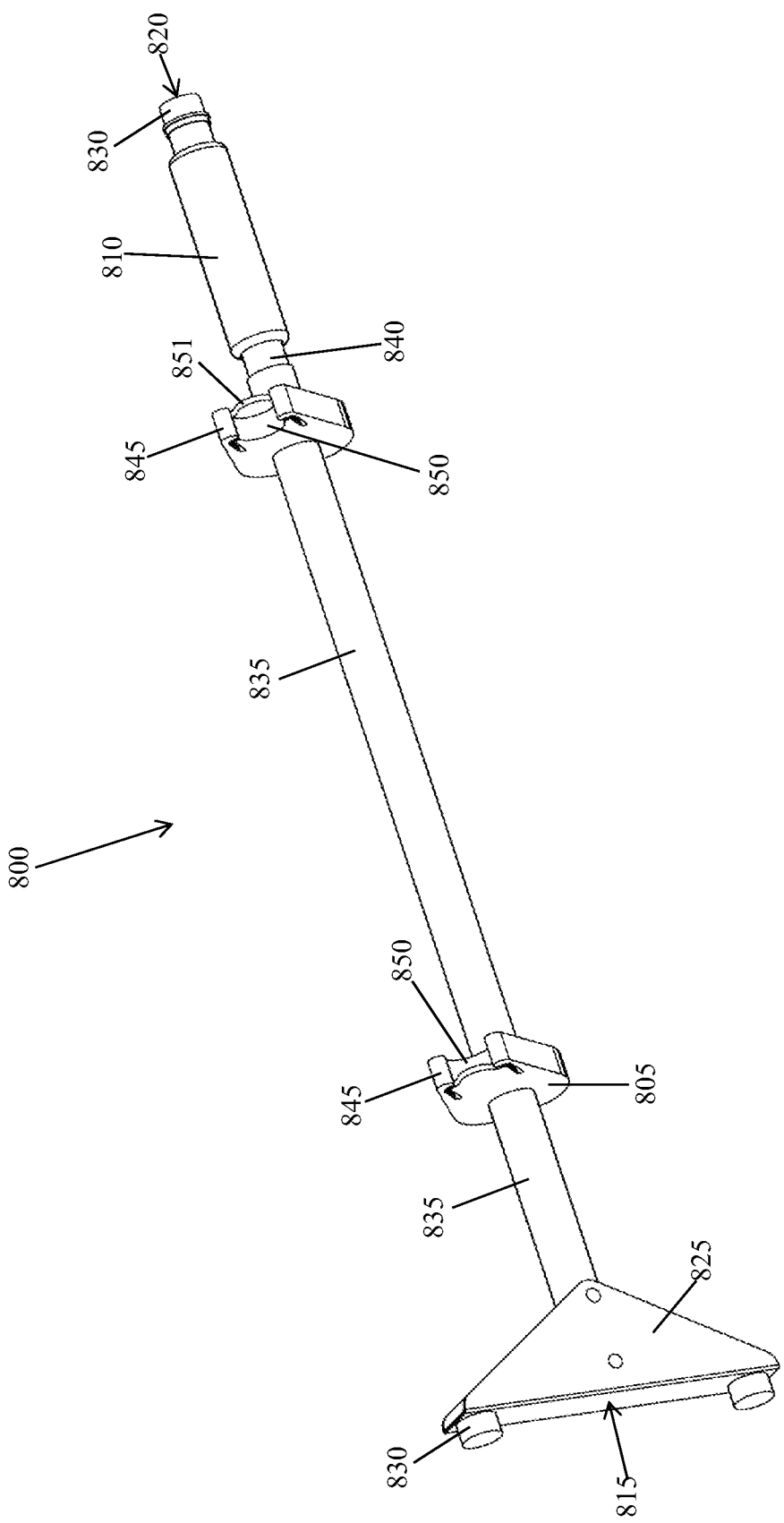
FIG. 11 is a perspective view of a telescoping doorway mount for use with a massage bar.

Referring now to FIG. 11, the mounting elements 805 may comprise a curved groove 850, slot, channel or reentrant opening configured to allow the massage bar 750 to rest within the mounting elements 805. The mounting elements 805 may be pivotally or fixedly coupled to the outer frame member 835 or the inner frame member 840. In a particular implementation, the mounting elements 805 are coupled to the outer frame member 835, and the outer frame member 835 passes through at least a portion of each mounting element 805.

Implementations of the mounting elements 805 may further comprise biased elements 845 or clips that assist in removably coupling or mounting the massage bar 750 to the mounting elements 805. Once the massage bar 750 is within the curved groove 850, the biased elements or clips act to hold the massage bar 750 within the curved groove 850. An implementation of the mounting element 805 may further comprise end covers 851 to hold the massage bar 750 between the mounting elements 805. Another implementation of the mounting element 805 may comprise ribs configured to fit within the slots 997 of massage bar 994.

An implementation of the telescoping doorway mount 800 may further comprise a rectangular base on the first end 815. Two walls 825 may be coupled to rectangular base and extend toward the second end 820. In other implementations, first end 815 may comprise any shape of base. Elongating the base, in the shape of a rectangle, ellipse, etc., provides additional support and stability to the telescoping doorway mount 800 when in use.

Additional support and stability may be provided by two walls 825 coupled to the first side 815 and extending toward the second side 820. In the implementation shown in FIGS. 10-13, the walls comprise triangular walls 825, although other shapes and configurations may be utilized in other implementations. The outer frame member 835 is typically located between the two walls 825, and may be coupled to the first end 815, the two walls 825, or both the first end 815 and the two walls 825. Various implementations for the telescoping doorway mount 800 may comprise at least one pad 830 on each side 815, 820 of the telescoping doorway mount 800, and a hand grip 810 on the inner frame member 840.

Figure 12:
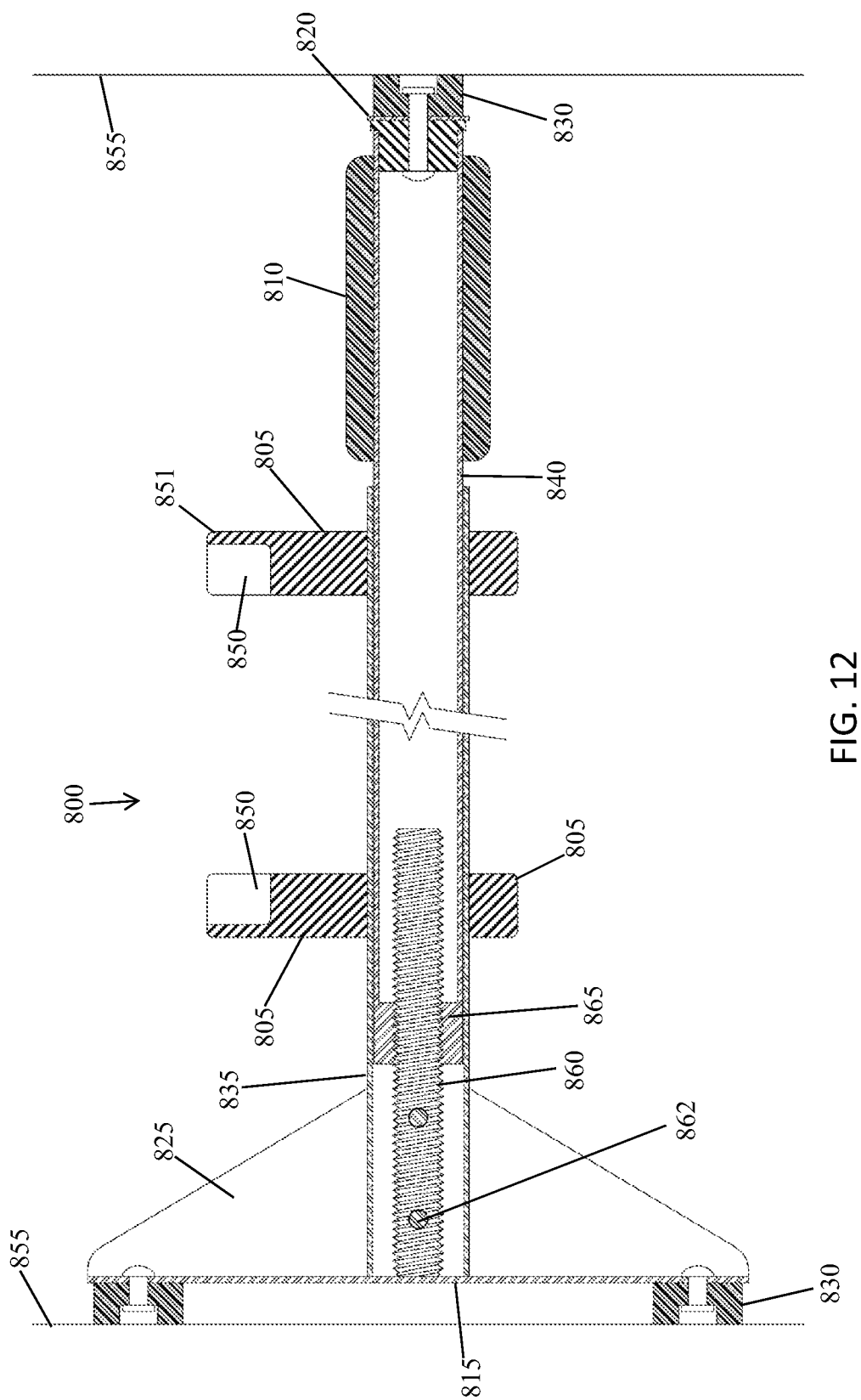
FIG. 12 is a partial cross sectioned side view of a telescoping doorway mount for use with a massage bar.

FIG. 12 illustrates a cross sectioned view of a telescoping doorway mount 800 coupled between two walls 855. In an implementation, the telescoping doorway mount 800 may comprise a male screw 860 coupled to either the first end 815 or between the two walls 825 and extending from the first end 815 towards the second end 820. Set screws 862 are utilized in the implementation of FIG. 12 to couple the male screw 860 to the telescoping doorway mount 800 between the two walls 825. In other implementations, whether or not the walls 825 are present, the male screw 860 may be coupled to the first end 815 in a variety of mechanisms know in the art, such as but not limited to welding, bolting, screws, adhesives, and the like.

An implementation of the telescoping doorway mount 800 may further comprise an inner frame member 840 that fits at least partially within the outer frame member 835 and is coupled to or extends from the second end 820. The inner frame member 840 may further comprise a female threaded end 865 located opposite the second end 820 and configured to couple to the male screw 860. The female threaded end 865 and the male screw 860 function in conjunction with each other to change the length of the telescoping doorway mount 800 such that the telescoping doorway mount 800 may be configured to fit within a variety of sized doorways.

For example, by rotating the inner frame member 840 a first direction, the female threaded end 865 is also rotated about the male screw 860 a first direction, which subsequently causes the female threaded end to move close to the first end 815 and shortens the telescoping doorway mount 800. By rotating the inner frame member 840 a second direction, the female threaded end 865 is rotated about the male screw 860 a second direction, which subsequently causes the female threaded end 865 to move further from the first end 815 and lengthens the telescoping doorway mount 800. In other implementations, the first and second frame members may be extended and shortened using mechanisms other than threaded connections. For example, a ratcheting extension, such as that disclosed in U.S. Pat. No. 5,947,666 to Huang titled "Cargo positioning device with quick retraction and reliable retaining function," the disclosure of which is hereby incorporated herein by reference, may alternatively be substituted for the rotating components of the embodiment of FIG. 12. The telescoping functionality is not limited to the specific mechanisms shown and described for enabling the functionality, which are provided as non-limiting examples. Other mechanisms known in the art are also contemplated.

Figure 13:
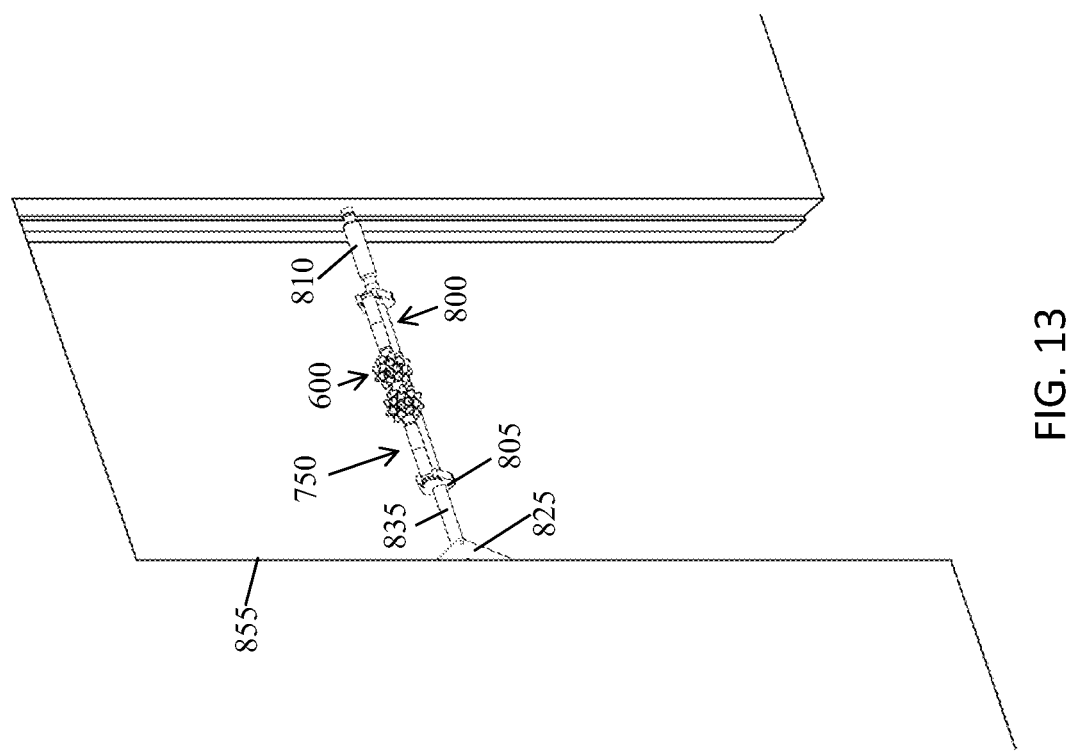
FIG. 13 is a perspective view of an exemplary mounting of a telescoping doorway mount, a massage bar, and massage apparatuses within a doorway.

FIG. 13 illustrates an exemplary use of the massage bar 750 mounted to the telescoping doorway mount 800. By mounting telescoping doorway mount 800 within a frame 855 and mounting the massage bar 750 on the telescoping doorway mount 800, functionality of massage apparatuses 600 is enhanced. For example, the structure and assembly of the massage bar 750 allow the massage apparatuses 600 to rotate about an axis formed by the shaft 753 of the massage bar. When mounted properly on the telescoping doorway mount 800 and when the doorway mount 800 is mounted within a doorway 855, a user may lean his or her body against the massage apparatus and move up and down. This allows a user, without the assistance of others, to utilize the massage apparatus on his/her back in areas previously unreachable without the assistance of others.

Figure 14:
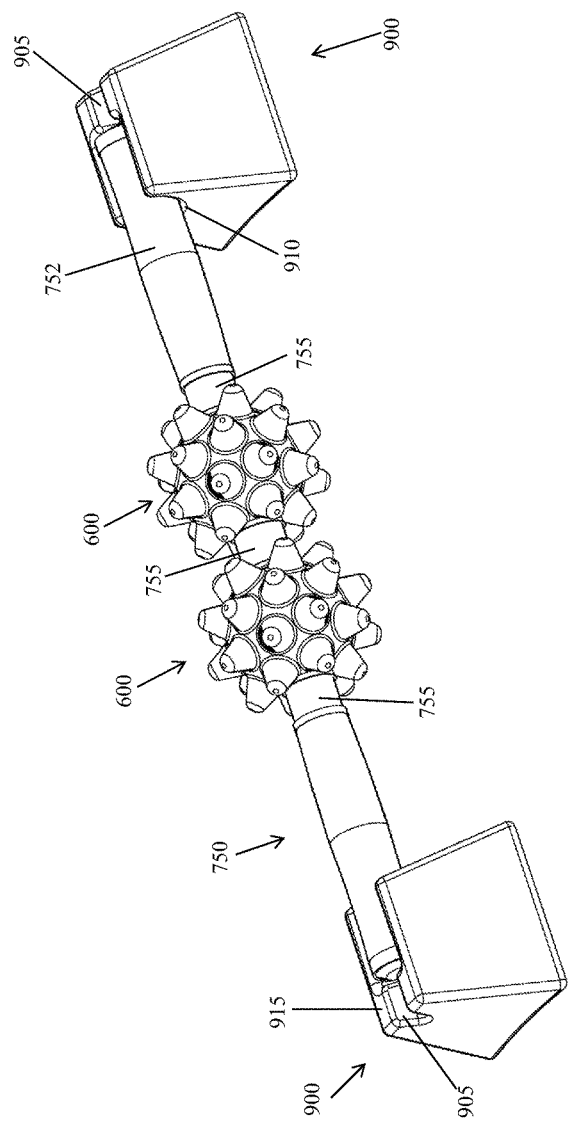
FIG. 14 is a perspective view of a massage bar mounted on a first implementation of surface mounts.
Figure 15:
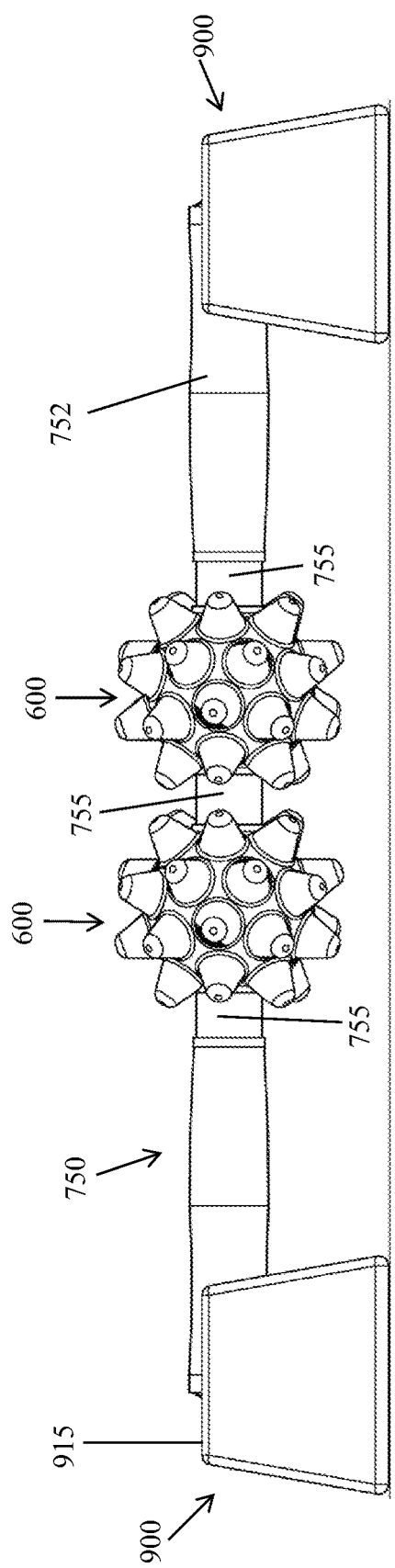
FIG. 15 is a side view of a massage bar mounted on a first implementation of surface mounts.
Figure 16:
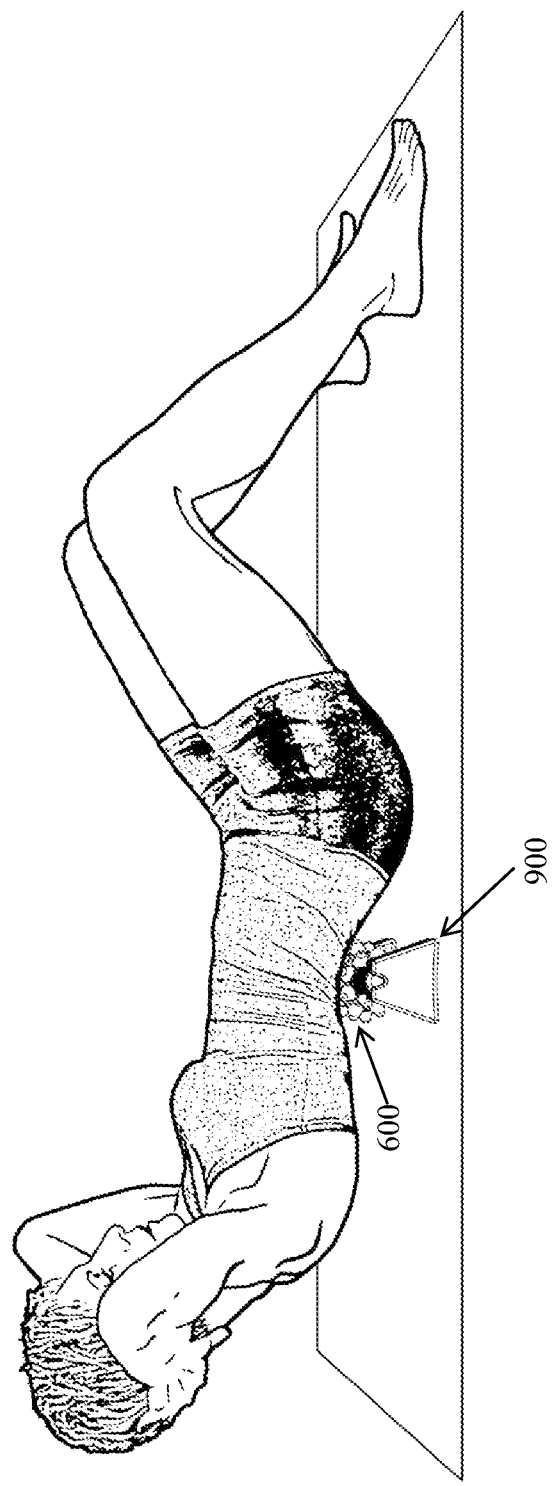
FIG. 16 is a perspective view of an exemplary use of a massage apparatus mounted on a first implementation of surface mounts.

Various implementations of massage bars 750, 994 may also be mounted just above a surface, such as the floor, on surface mounts 900, 951. FIGS. 14-16 illustrate massage bar 750 mounted on an implementation of surface mounts 900. Although described as a surface "mount", the surface mounts 900, 951 do not require that the mounts themselves be mounted to any particular surface, but merely that the massage bars 750, 994 can mount into the surface mounts 900, 951 for placement and use on the floor, wall or other surface. In the implementation of FIGS. 14-16, a base side of the surface mounts 900 is configured to rest on a flat or substantially flat surface. A top side 915 of the surface mount 900 may comprise a curved slot 910, groove, or channel configured to hold a handle 752 or shaft 753 of the massage bar 750. In one implementation, the curved slot 710 extends all the way from one side wall of the surface mount 900 through to an opposing side wall of the surface mount 900. In the implementation illustrated in FIGS. 14-16 each surface mount comprises a larger slot 910 and a small slot 905 that together form a channel that extends from one side wall of the surface mount 900 through to an opposing side wall of the surface mount 900. In still other implementations, the surface mount 900 may comprise only one slot 910 that extends only partially within the surface mount 900.

Referring specifically to FIG. 16, an exemplary use of the surface mount 900, massage bar 750, and massage apparatus 600. Various implementations of the surface mount 951, massage bar 994, and massage apparatus may be similarly utilized. The surface mounts 900 allow a user to utilize the massage apparatus(es) 600 to massage his or her back or any other body part without the assistance of others. The surface mounts 900 are configured to lift the massage bar 750 high enough off the ground that the massage apparatuses 600 do not touch the ground surface when the massage bar 750 is resting in the curved slot 910. As previously described, the massage apparatuses 600 are pivotally or rotationally coupled about the shaft 753. Accordingly, in combination with the surface mount 900, the massage apparatuses 600 may rotate freely about an axis formed by the shaft 753 when the massage bar 750 is resting on or within the surface mount 900. A user may then lay his or her body on the massage apparatuses 600, as shown, and move in various directions, thus causing the massage apparatuses 600 to roll over his or her body without the assistance of others.

Figure 17:
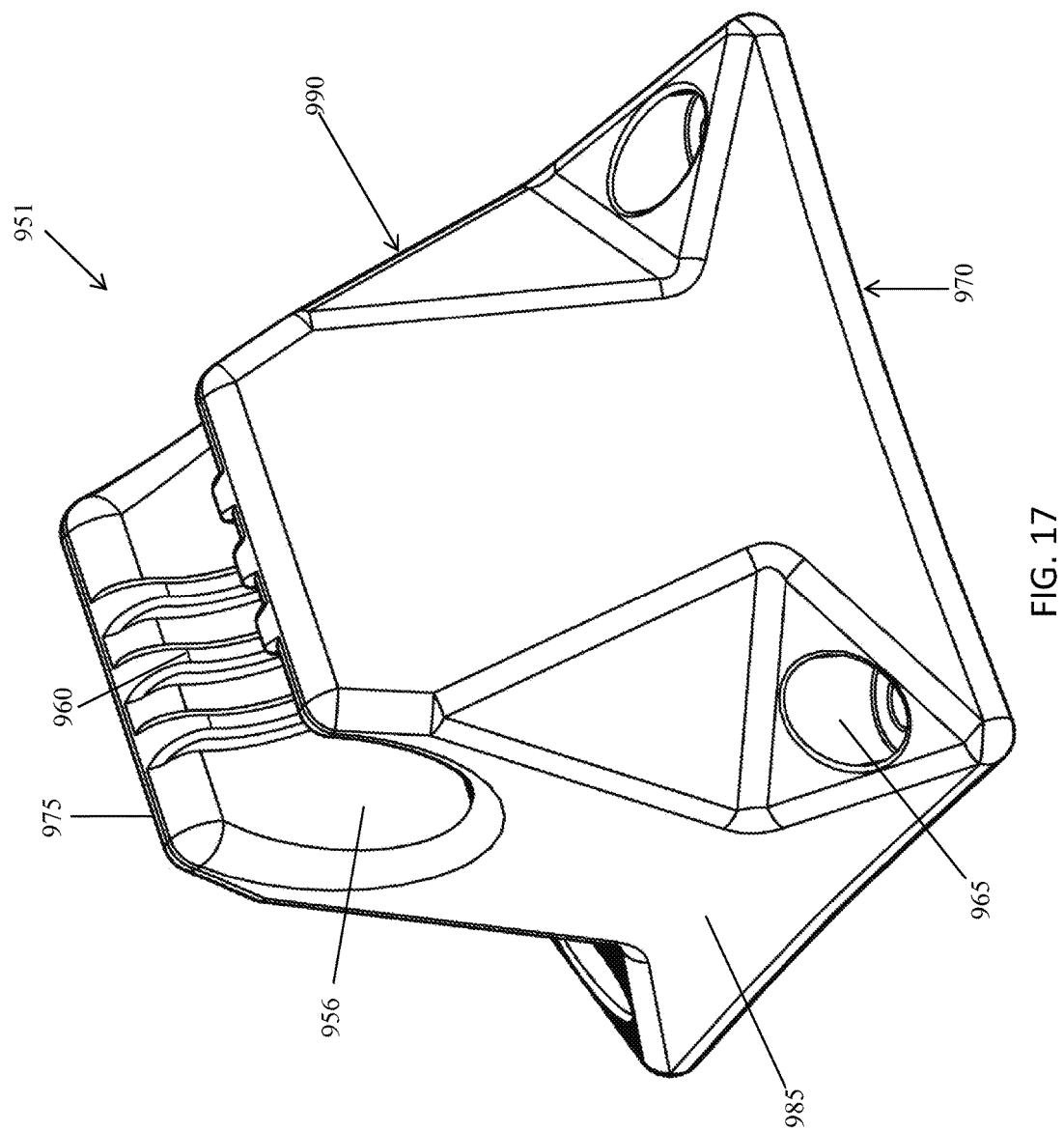
FIG. 17 is a top perspective view of a ribbed surface mount.

FIG. 17 illustrates a ribbed surface mount 951. Ribbed surface mount 951 may function similar to surface mount 900, but provides additional features that may be added to surface mount 900. Ribbed surface mount 951 comprises a curved slot 956 or groove on the top side 975 that creates a channel all the way from a first wall 985 to an opposing second wall 990. In other implementations, the curved slot 956 may only partially extend into either first wall 985 or second wall 990.

The curved slot 956 of ribbed surface mount 951 further comprises at least one rib 960 that extends inward from the curved slot 956. As shall be shown in FIGS. 21-23, the at least one rib may function to assist in mounting the massage bar 994 to the ribbed surface mounts 951. The dimensions of the rib 960 may vary according to different embodiments, and may therefore extend only partially along the curved slot 956, or alternatively extend from the top side 975 to the bottom of the slot 956 to the opposing top 975 side. In the implementation illustrated in FIG. 17, the ribs 960 are substantially parallel to the first 985 and second 990 walls. In other implementations, the ribs 960 may run perpendicular to the walls 985, 990, or any other angle relative to walls 985, 990. In still other implementations, similarly situated grooves may be used in place of ribs.

Implementations of the ribbed surface mount 951 may further comprise screw holes 965 that extend through angled walls of the ribbed surface mount 951 to the bottom side 970. The screw holes 965 may be utilized to securely fasten the ribbed surface mount 951 to the ground, a wall, a doorway, or any other surface.

Figure 18:
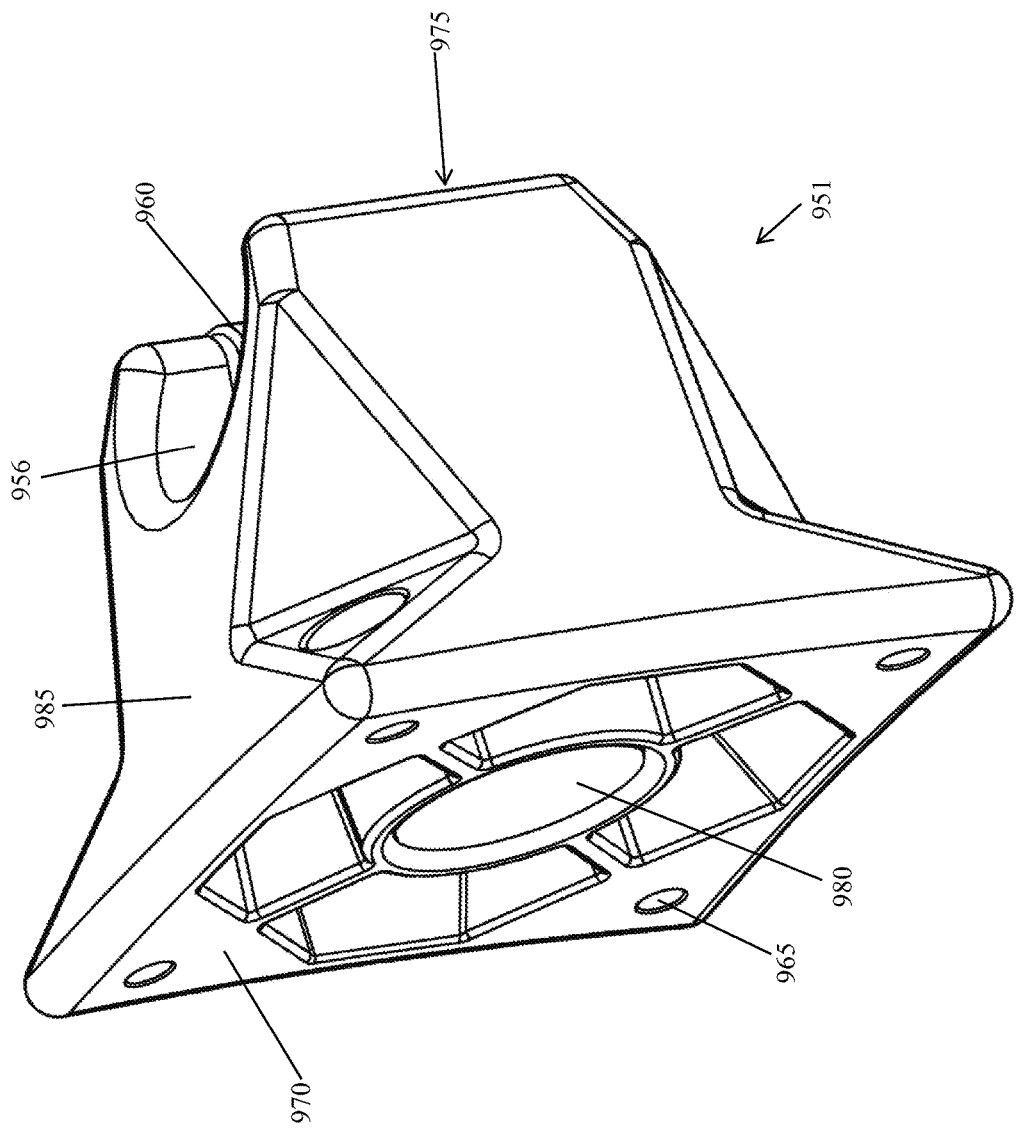
FIG. 18 is a bottom perspective view of a ribbed surface mount.

Referring now to FIG. 18, an implementation of the ribbed surface mount 951 may further comprise aperture 980 on the bottom side 970 of the ribbed surface mount 951. In the implementation of FIG. 18, the aperture 980 is configured to hold at least a portion of the handles 995 or shaft 753 within the aperture 980. In various implementations, the aperture 980 may extend all the way through the surface mount 951 from the bottom side 970 to the top side 975, or may alternatively extend only partly into the ribbed surface mount 951.

Figure 19:
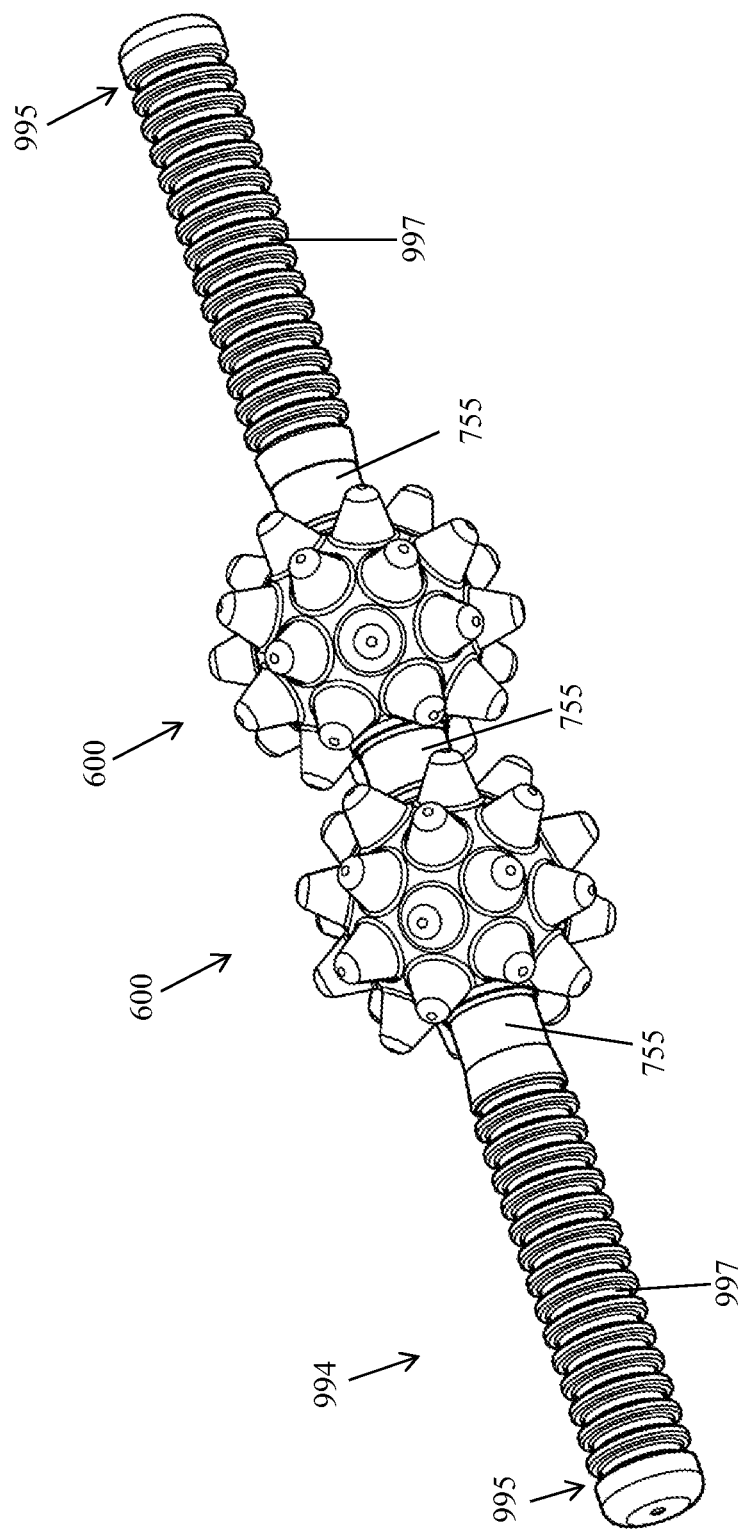
FIG. 19 is a perspective view of a second implementation of a massage bar.

FIG. 19 illustrates a perspective view of an implementation of a massage bar 994. Like previously described massage bar implementations, massage bar 994 may comprise massage apparatuses 600 and sleeves 755. The massage bar 994 further comprises handles 995 on opposing ends of the massage bar 994. While massage bar 994 may comprise handle 752 as previously illustrated, an implementation may comprise grooved handles 995. The grooved handles 995 may comprise at least one groove 997 configured to fit the rib 960 of surface mount 951 within the groove 997. Various implementations of grooved handles 995 may comprise any number of grooves 997. In still other implementations, the handles may comprise ribs that are configured to fit within grooves on an implementation of a surface mount.

Figure 20:
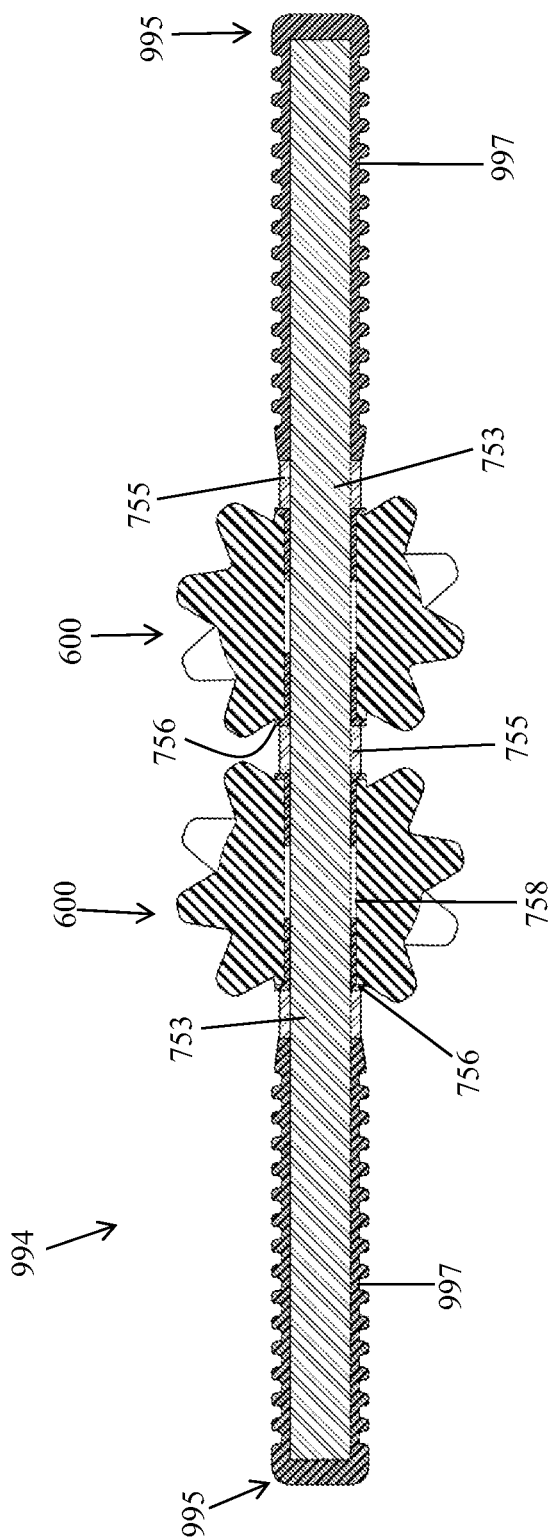
FIG. 20 is a cross-sectioned view of a second implementation of a massage bar.
Figure 21:
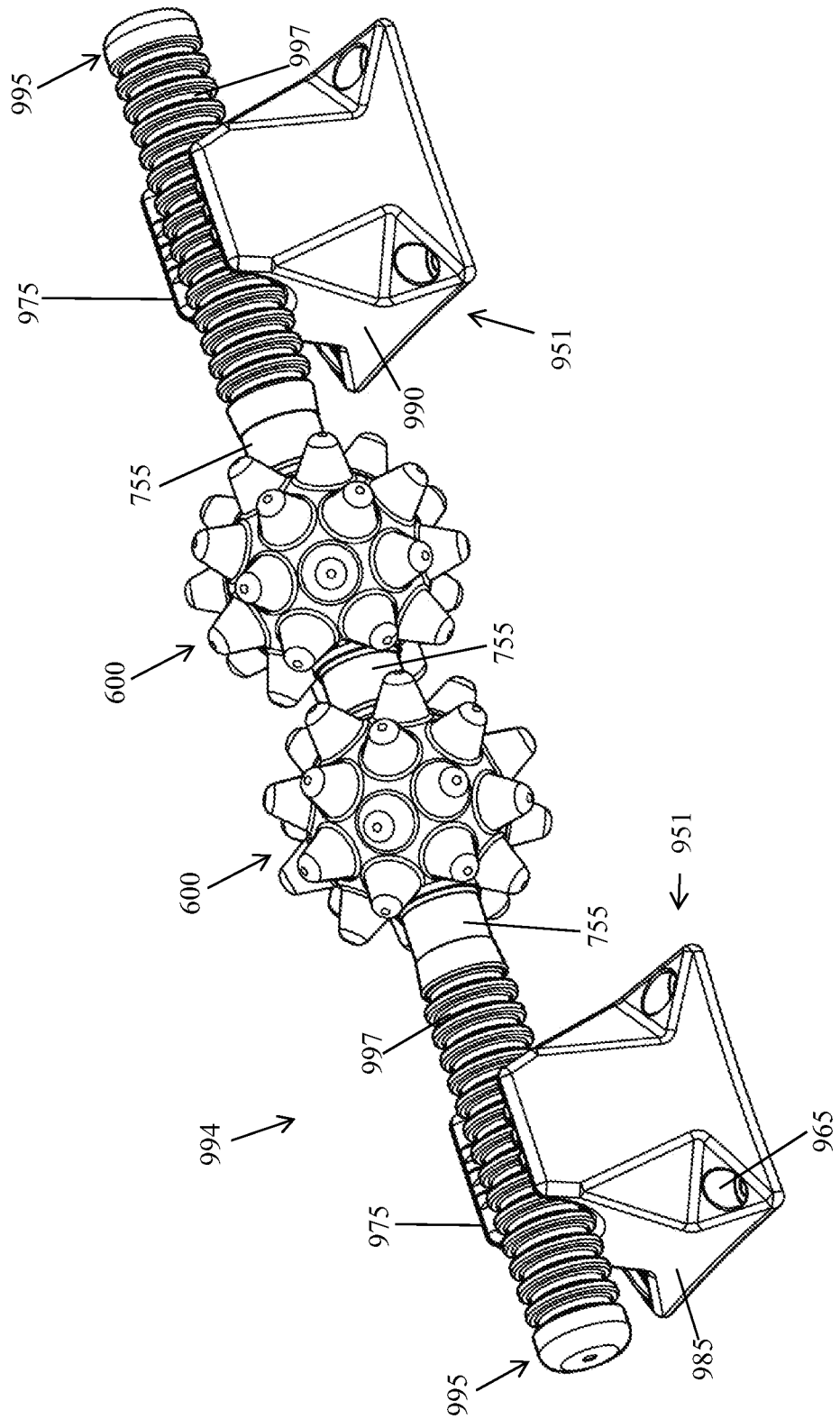
FIG. 21 is a perspective view of a second implementation of a massage bar mounted on ribbed surface mounts.
Figure 22:
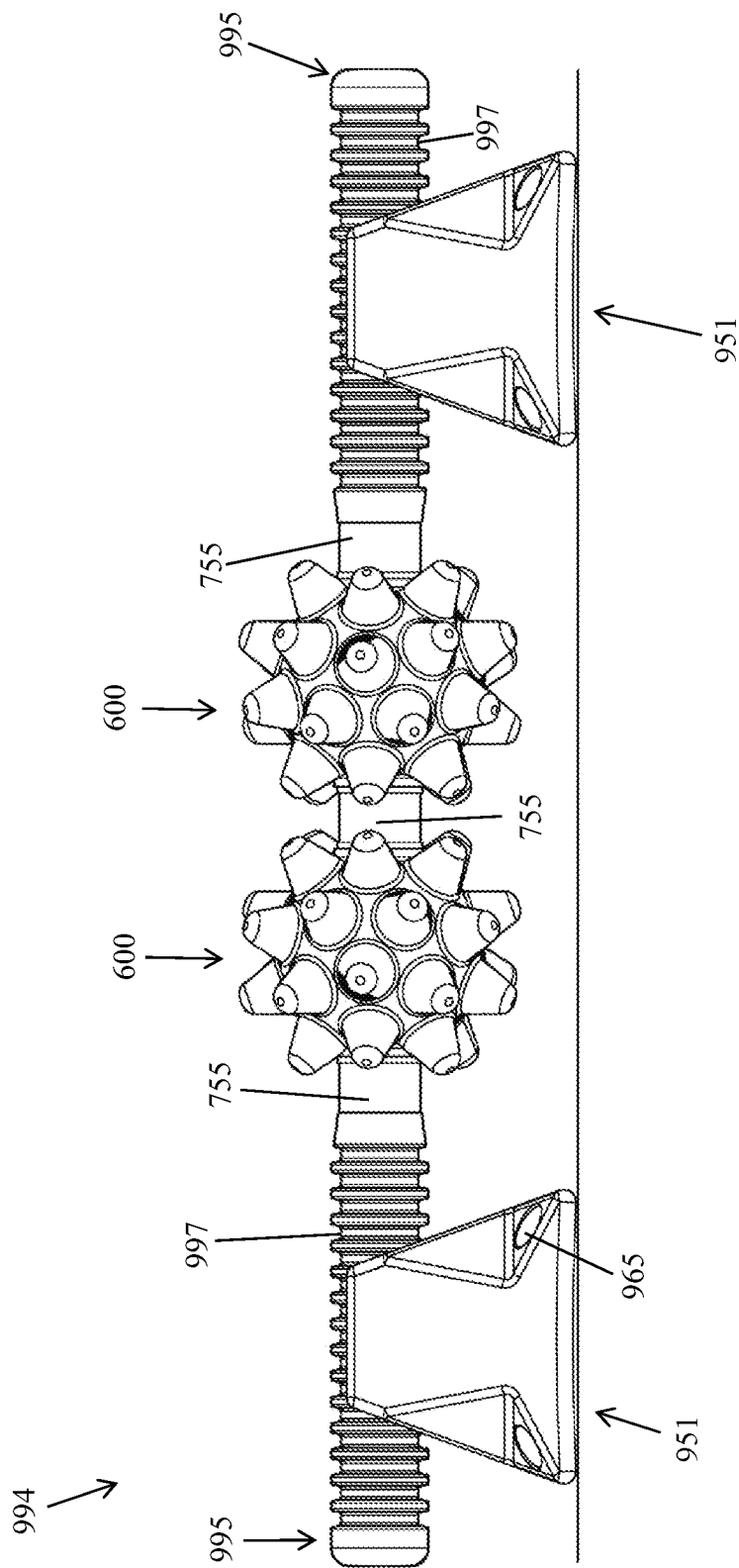
FIG. 22 is a perspective view of a second implementation of a massage bar mounted on ribbed surface mounts.
Figure 23:
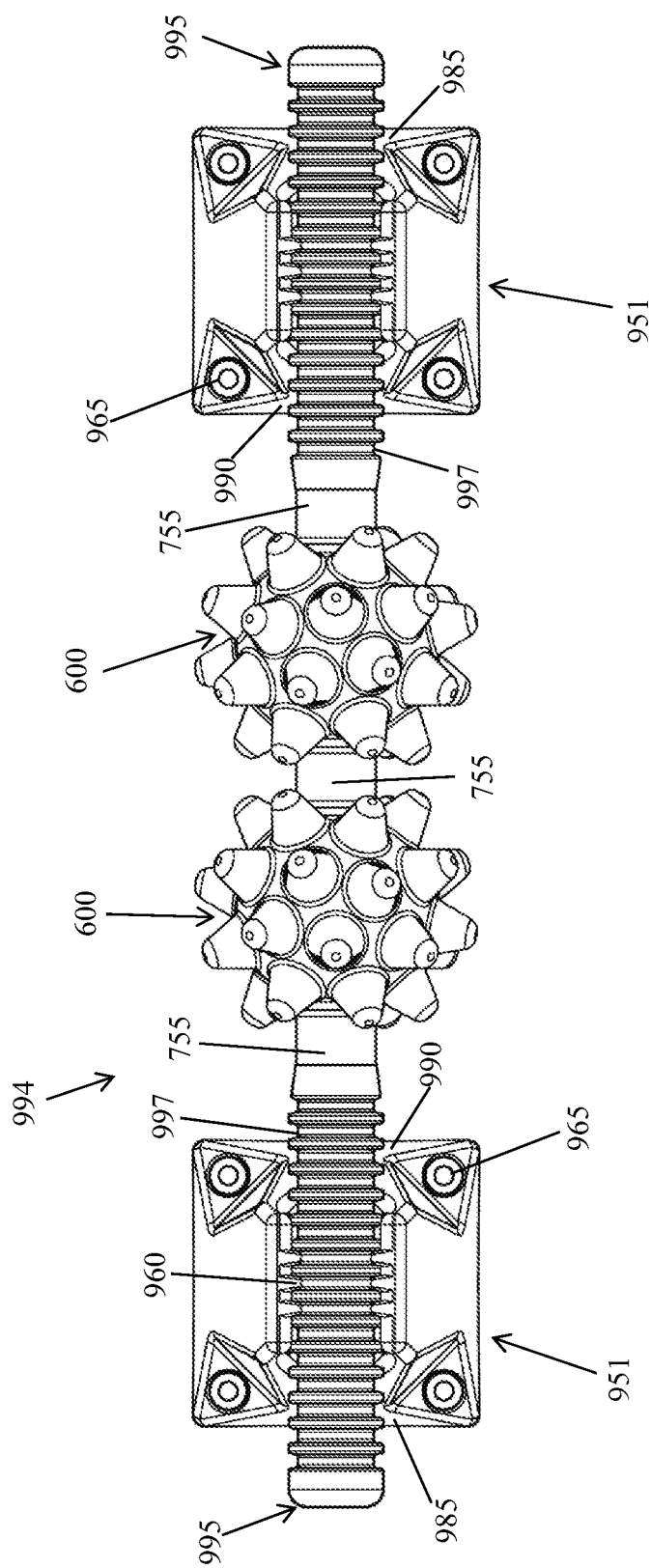
FIG. 23 is a top view of a second implementation of a massage bar mounted on ribbed surface mounts.

FIG. 20 illustrates a cross section view of massage bar 994. As previously noted, massage bar may comprise a similarly situated shaft 753, sleeves 755, massage apparatus bore holes 758, and flange bearings 756. As shown, the shaft 753 is not externally visible. In other implementations, however, the shaft 753 may be externally visible or exposed. In still other implementations, the massage bars 750, 994 may function without handles 995, 752.

While the implementation of FIG. 20 comprises a single cylindrical shaft 753 with a uniform diameter, other implementations are not so limited. In another implementation, multiple shafts may be coupled together, or shaft may comprise a thinner, pin like element that extends through the massage apparatuses 600. In still other implementations, any combination of shafts or other elements that allows for the rotation of the massage apparatus about an axis formed by the shaft may be utilized.

FIGS. 21-24 illustrated various views of massage bar 994 mounted on ribbed surface mounts 951. The combination of the grooved handles 995 and ribbed surface mounts 951 provide additional stability to the system. By placing the ribs 960 within the grooves 997, the massage bar 994 is less likely to slide about in undesired directions while in use. This allows for increased pressure to be placed on the massage apparatuses 600 (as shown in FIG. 16) without concern that massage bar 994 will slip out of the ribbed surface mounts 951.

Figure 24:
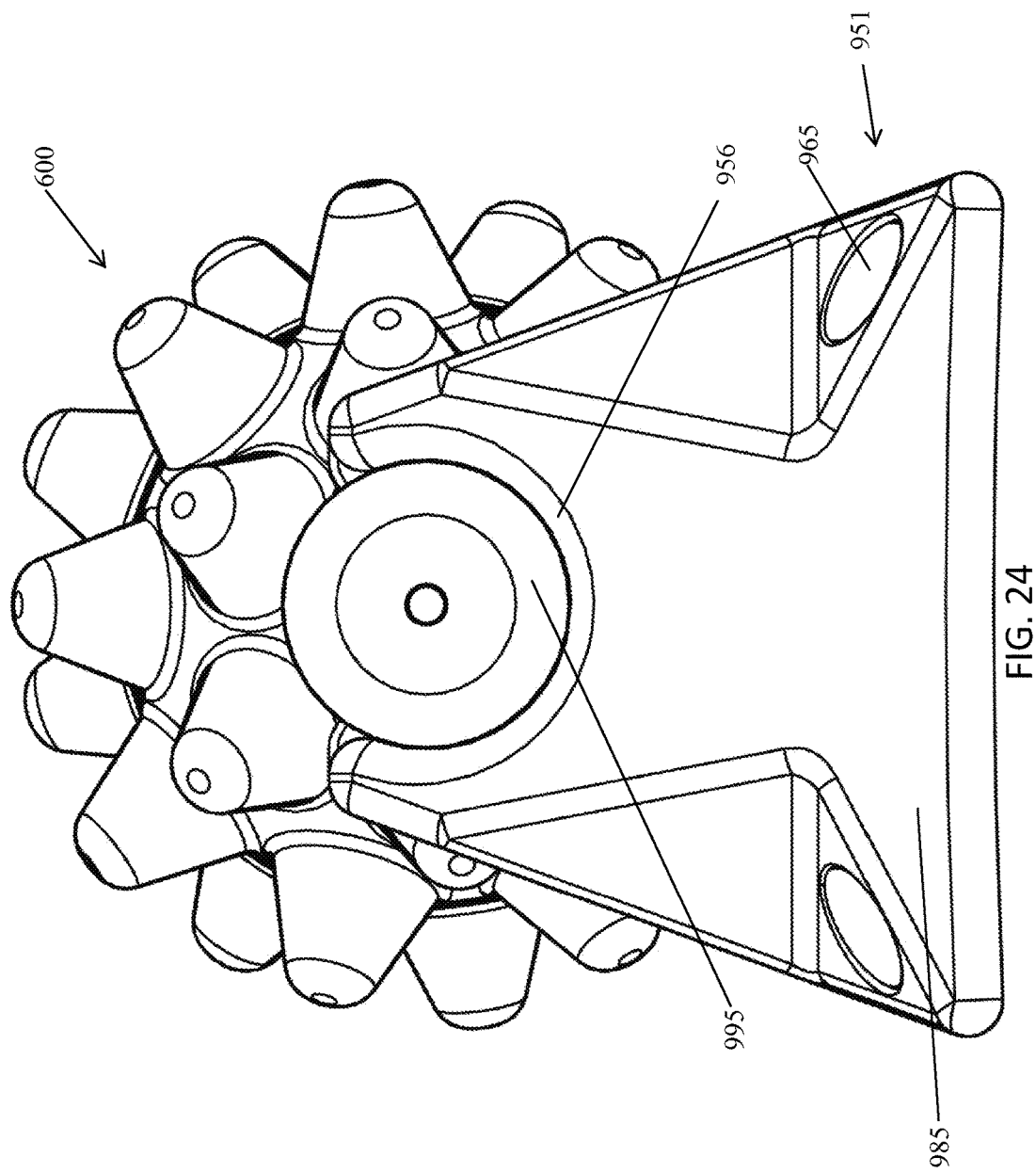
FIG. 24 is a side view of a second implementation of a massage bar mounted on ribbed surface mounts.

Referring particularly to FIG. 24, in an implementation the curved slot 956 may, when viewed from the side, comprise a curve that is greater than a half-circle. As such, the top sides 975 of the curved slot 956 are at least partially biased against the handles 995 when the massage bar 994 is insert into the ribbed surface mounts 951. Other implementations may comprise biased elements or clips similar to the mounting elements 805 of the telescoping doorway mount 800. Still other implementations may comprise straps, clips, clamps, or other elements configured to hold the handle 995 within the ribbed surface mount 951.

Figure 25:
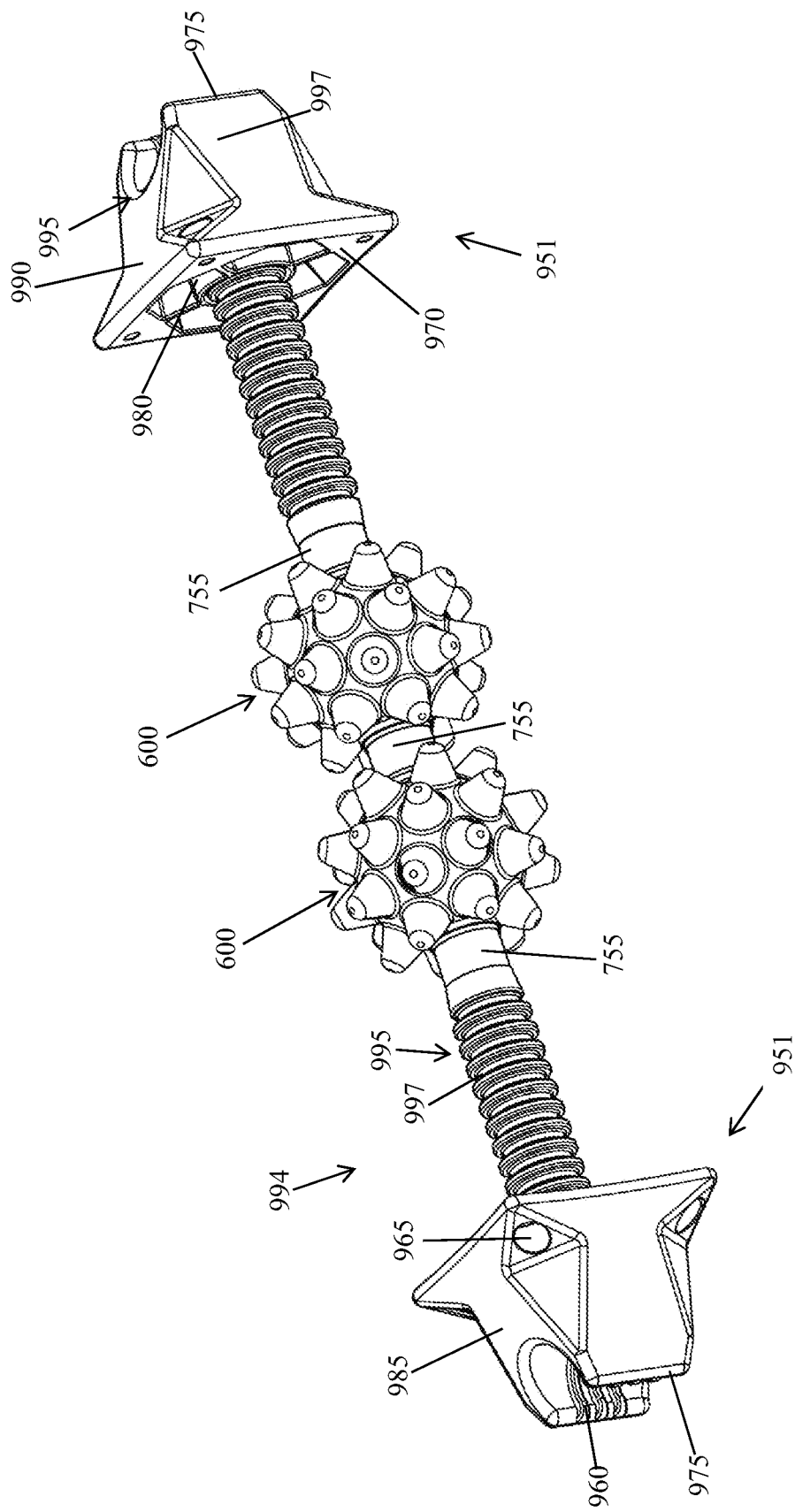
FIG. 25 is a perspective view of a second implementation of a massage bar mounted in bottom apertures on the ribbed surface mounts.

FIG. 25 illustrates another function of an implementation of ribbed surface mounts 951. Here, the handles 995 of massage bar 994 are within the apertures 980 of ribbed surface mounts 951. Such a configuration allows for more efficient shipping and packaging of the massage bar 994, massage apparatuses 600, and ribbed surface mounts 951. In the illustrated configuration or assembly, the ribbed surface mounts 951 keep the massage bar 994 centered in a box and eliminate the need for package inserts or fillers, while simultaneously occupying less space than if assembled in a typical manner.

In implementations where the aperture 980 extends all the way through the ribbed surface mount 950, the ribbed surface mount 950 may be mounted to a wall, a floor or doorway, as non-limiting examples of surfaces. Once two surface mounts 950 are mounted to opposing walls or doorways, a properly lengthened massage bar 994 may be placed within the apertures 980, thus mounting the massage bar 994 between the ribbed surface mounts 950. This implementation may utilize telescoping massage bar with two shafts that function similar to the telescoping aspect of the telescoping doorway mount 800 previously described.

It will be understood that implementations are not limited to the specific components disclosed herein, as virtually any components consistent with the intended operation of a method and/or system implementation for massage apparatuses may be utilized. Accordingly, for example, although particular massage apparatuses may be disclosed, such components may comprise any shape, size, style, type, model, version, class, grade, measurement, concentration, material, weight, quantity, and/or the like consistent with the intended operation of a method and/or system implementation for massage apparatuses may be used.

In places where the description above refers to particular implementations of massage apparatuses, it should be readily apparent that a number of modifications may be made without departing from the spirit thereof and that these implementations may be applied to other massage apparatuses. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. A massage device mounting system, comprising:
   two mounting elements, each comprising a slot;
   a massage bar comprising a cylindrical shaft and two opposing bar ends with a handle disposed about each opposing bar end, each handle mounted within a different one of the slots of the two mounting elements;
   at least one massage apparatus pivotally coupled to the cylindrical shaft and comprising a bore hole through a central axis of the massage apparatus, the bore hole housing at least a portion of the cylindrical shaft; and
   wherein the massage apparatus further comprises an array consisting essentially of at least thirty massage fingers and no more than thirty-two massage fingers arranged on a body such that a center axis of each of the at least thirty massage fingers aligns with a different one of thirty-two vertex axes that extend from a body center point formed by an intersection corresponding to each vertex axis to a different one of thirty-two vertices of a theoretical pentakis dodecahedron having a center point corresponding to the body center point;
   wherein the two mounting elements are separate elements adjoined with one another only by the massage bar, and
   wherein the two mounting elements comprise two surface mounts each comprising a base end, a side wall, and a top end opposite the base end, and the slot comprises a reentrant curved slot on the top end of each surface mount, wherein each handle is mounted within the curved slot of one of the two surface mounts, and wherein the slot on the top end of each surface mount extends from the sidewall of the respective surface mount.

2. The mounting system of claim 1, further comprising a telescoping mounting system coupled to the two mounting elements, the telescoping mounting system comprising a first end and a second end opposite the first end, wherein a positional distance between the first end and the second end is adjustable by telescoping the mounting system between an extended position and a retracted position.

3. The mounting system of claim 2, the telescoping mounting system further comprising:
   the first end coupled to an outer frame member and the second end extending directionally from the first end towards the second end;
   a male screw coupled to the first end and housed within an outer frame member; and
   an inner frame member at least partially within the outer frame member and coupled to the second end and the male screw, the inner frame member comprising a female threaded end that couples to the male screw,
   wherein a length of the telescoping doorway mount is changed to fit within a doorway when the inner frame member is rotated along the male screw.

4. The mounting system of claim 3, wherein the slots of the two mounting elements each comprise a curved notch and one or more flexibly biased elements that hold the massage bar within the curved notch.

5. The mounting system of claim 4, wherein the first end of the doorway mount comprises a rectangular base and two walls extending from the rectangular base towards the second side, wherein the outer frame member and the male screw are between the walls and coupled to the walls.

6. The mounting system of claim 2, the telescoping mounting system further comprising a ratcheted interface between the first end and the second end.

7. The mounting system of claim 1, wherein at least a portion of each of the two mounting elements comprises a flexible bias such that the curved slot flexes as the handle is inserted into the curved slot.

8. The mounting system of claim 1, further comprising at least one rib in each of the curved slots and at least one groove on each of the handles, the at least one rib configured to fit within the at least one groove.

9. The mounting system of claim 1, further comprising at least one screw hole that extends through the base end of each of the two surface mounts.

10. The mounting system of claim 1, further comprising an aperture on the base end of each surface mount, the aperture sized to hold one of the two handles.

11. The mounting system of claim 1, wherein the at least one massage apparatus comprises two massage apparatuses and the massage bar further comprises:
   a flange bearing on each side of each bore hole;

a first and second sleeve disposed about the cylindrical shaft such that the two massage apparatuses are between the first and second sleeves;

a third sleeve disposed about the cylindrical shaft between the two massage apparatuses; and two handles coupled to the shaft on opposing ends of the shaft, the two handles positioned such that the two massage apparatuses are between the two handles on the shaft.

12. A system for mounting a massage apparatus for pivotal use, comprising:

a massage bar comprising a cylindrical shaft inserted through a hole on the massage apparatus such that the massage apparatus rotates about the cylindrical shaft;

two handles disposed about opposite ends of the cylindrical shaft, two mounting elements each holding one of the two handles disposed at opposite ends of the massage bar;

at least one massage apparatus pivotally coupled to the cylindrical shaft and comprising a bore hole through a central axis of the massage apparatus, the bore hole housing at least a portion of the cylindrical shaft; and wherein the massage apparatus further comprises an array consisting essentially of at least thirty massage fingers and no more than thirty-two massage fingers arranged on a body such that a center axis of each of the at least thirty massage fingers aligns with a different one of thirty-two vertex axes that extend from a body center point formed by an intersection corresponding to each vertex axis to one of thirty-two vertices of a theoretical pentakis dodecahedron having a center point corresponding to the body center point;

wherein the two mounting elements comprise two surface mounts each comprising a base end, a side wall, and a top end opposite the base end, wherein each of the two handles is mounted within a reentrant curved slot on the top end of one of the two surface mounts, and wherein the reentrant curved slot on the top end of each surface mount extends from the side wall of the respective surface mount, and wherein the two mounting elements are separate elements adjoined with one another only by the massage bar.

13. The system for mounting a massage apparatus for pivotal use of claim 12, the massage bar further comprising:

two flange bearings that stabilize rotation of the massage apparatus about the cylindrical shaft and are disposed at least partially within opposite ends of the bore hole; and two hollow sleeves, each hollow sleeve abutting a respective one of the two flange bearings and disposed about the cylindrical shaft.

14. The system for mounting a massage apparatus for pivotal use of claim 12, further comprising a telescoping doorway mount coupled to the two mounting elements, the telescoping doorway mount comprising a first end and a second end opposite the first end, wherein a positional distance between the first end and the second end is adjustable by telescoping the doorway mount between an extended position and a retracted position.

15. The mounting system of claim 14, the telescoping doorway mount further comprising a ratcheted interface between the first end and the second end.

16. The system for mounting a massage apparatus for pivotal use of claim 14, the telescoping doorway mount comprising:

an outer frame member distal to the first end of the doorway mount;

a male screw coupled to the first end and extending toward the second end of the telescoping doorway mount; and an inner frame member at least partially within the outer frame member and distal the second end of the doorway mount, the inner frame member comprising a female threaded end that couples to the male screw, wherein a length of the telescoping doorway mount is changed to fit within a doorway when the inner frame member is rotated along the male screw.

17. The system for mounting a massage apparatus for pivotal use of claim 16, wherein the two mounting elements each comprise a curved notch and one or more biased elements that hold the massage bar within the curved notch.

18. The system for mounting a massage apparatus for pivotal use of claim 12, further comprising at least one rib in each of the curved slots and at least one groove on each of the handles, the at least one rib configured to fit within the at least one groove.

19. The system for mounting a massage apparatus for pivotal use of claim 12, further comprising at least one screw hole that extends through the base end of each of the two surface mounts.

20. The system for mounting a massage apparatus for pivotal use of claim 12, further comprising an aperture on the base end of each surface mount, the aperture sized to hold one of the two handles.

* * * * *